(12) United States Patent
Shambik et al.

(10) Patent No.: US 10,152,649 B2
(45) Date of Patent: Dec. 11, 2018

(54) DETECTING VISUAL INFORMATION CORRESPONDING TO AN ANIMAL

(71) Applicant: MOBILEYE VISION TECHNOLOGIES LTD., Jerusalem (IL)

(72) Inventors: Yakov Shambik, Jerusalem (IL); Noam Yogev, Ganei Tikva (IL); Erez Dagan, Tel Aviv (IL)

(73) Assignee: Mobileye Vision Technologies Ltd., Jerusalem (IL)

( * ) Notice: Subject to any disclaimer, the term of this patent is extended or adjusted under 35 U.S.C. 154(b) by 0 days.

(21) Appl. No.: 15/366,570

(22) Filed: Dec. 1, 2016

(65) Prior Publication Data

US 2017/0154241 A1    Jun. 1, 2017

Related U.S. Application Data

(60) Provisional application No. 62/261,598, filed on Dec. 1, 2015, provisional application No. 62/272,181, filed on Dec. 29, 2015.

(51) Int. Cl.
| | |
|---|---|
| G06K 9/00 | (2006.01) |
| G06K 9/62 | (2006.01) |
| B60R 1/00 | (2006.01) |
| B60R 11/04 | (2006.01) |
| G06K 9/46 | (2006.01) |

(Continued)

(52) U.S. Cl.
CPC ............ *G06K 9/6202* (2013.01); *B60R 1/00* (2013.01); *B60R 11/04* (2013.01); *G06K 9/00369* (2013.01); *G06K 9/00805* (2013.01); *G06K 9/4642* (2013.01); *G08G 1/16* (2013.01); *G08G 1/166* (2013.01); *H04N 7/183* (2013.01); *B60R 2011/0026* (2013.01); *B60R 2300/105* (2013.01); *B60R 2300/307* (2013.01); *B60R 2300/8053* (2013.01);
(Continued)

(58) Field of Classification Search
CPC ............ G06K 9/6202; G06K 9/00369; G06K 9/6215; B60R 1/00; G08G 1/16
USPC ......................................................... 382/103
See application file for complete search history.

(56) References Cited

U.S. PATENT DOCUMENTS

| | | |
|---|---|---|
| 8,082,101 B2 | 12/2011 | Stein et al. |
| 2008/0130954 A1* | 6/2008 | Taniguchi .......... G06K 9/00369 382/104 |

(Continued)

OTHER PUBLICATIONS

International Search Report and Written Opinion dated Nov. 2, 2017, received in corresponding International Application No. PCT/IB2016/002028 (18 pages).

*Primary Examiner* — Van D Huynh
(74) *Attorney, Agent, or Firm* — Finnegan, Henderson, Farabow, Garrett & Dunner, LLP

(57) ABSTRACT

A system for detecting an animal in a vicinity of a vehicle is disclosed. The system includes at least one processor programmed to receive, from an image capture device, at least one image of the vicinity of the vehicle; analyze the at least one image using a truncated animal appearance template to detect visual information suspected to be associated with an animal, wherein the truncated animal appearance template corresponds to a portion of a body and one or more limbs of a suspected animal; and initiate a vehicle response based on the detected visual information of the suspected animal in the at least one image.

23 Claims, 23 Drawing Sheets

(51) Int. Cl.
*G08G 1/16* (2006.01)
*H04N 7/18* (2006.01)
*B60R 11/00* (2006.01)

(52) U.S. Cl.
CPC .. *B60R 2300/8093* (2013.01); *G06K 9/00362* (2013.01); *G06K 2009/4666* (2013.01)

(56) References Cited

U.S. PATENT DOCUMENTS

| | | |
|---|---|---|
| 2010/0020170 A1* | 1/2010 | Higgins-Luthman ..................... B60Q 1/1423 348/135 |
| 2014/0074359 A1 | 3/2014 | Lane |
| 2014/0285667 A1* | 9/2014 | Aimura .................. G08G 1/166 348/148 |
| 2015/0123816 A1 | 5/2015 | Breed |
| 2016/0355181 A1* | 12/2016 | Morales Teraoka .. B60W 30/14 |

* cited by examiner

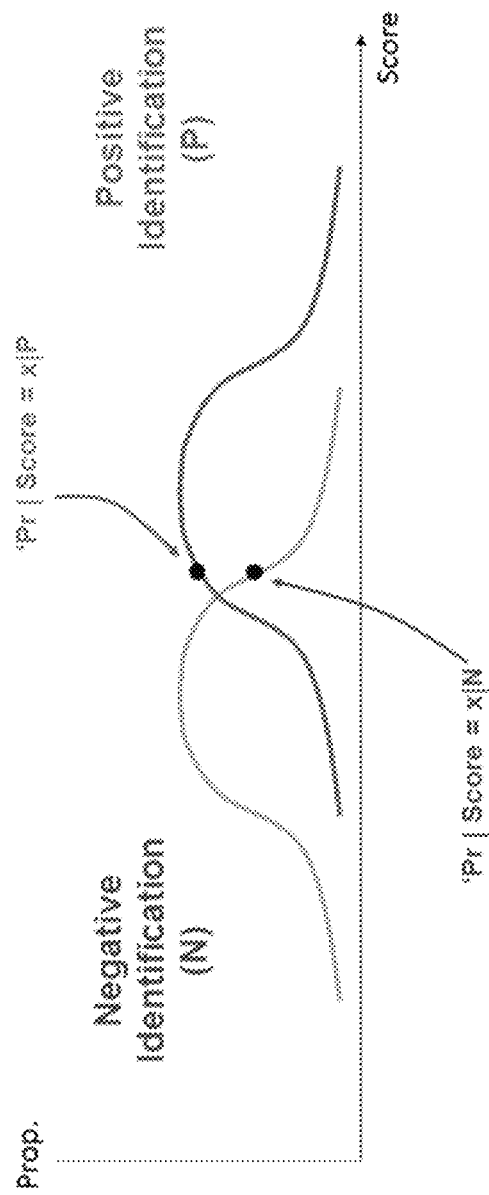
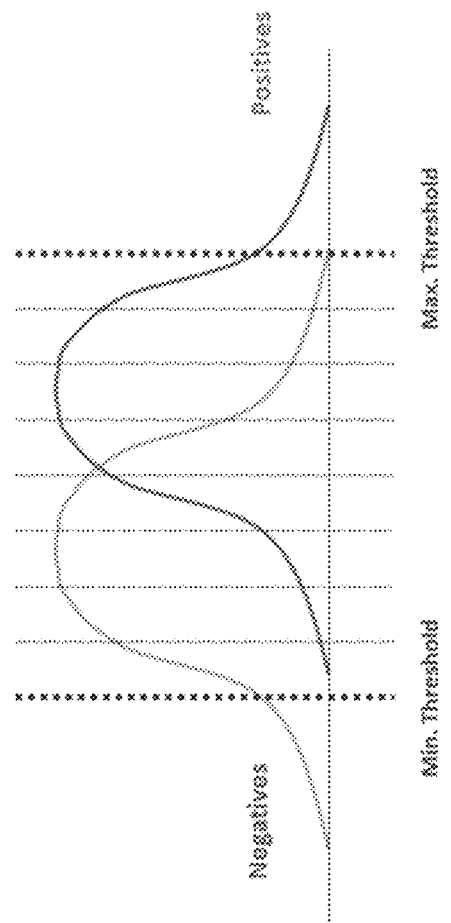
FIG. 11A
FIG. 11B

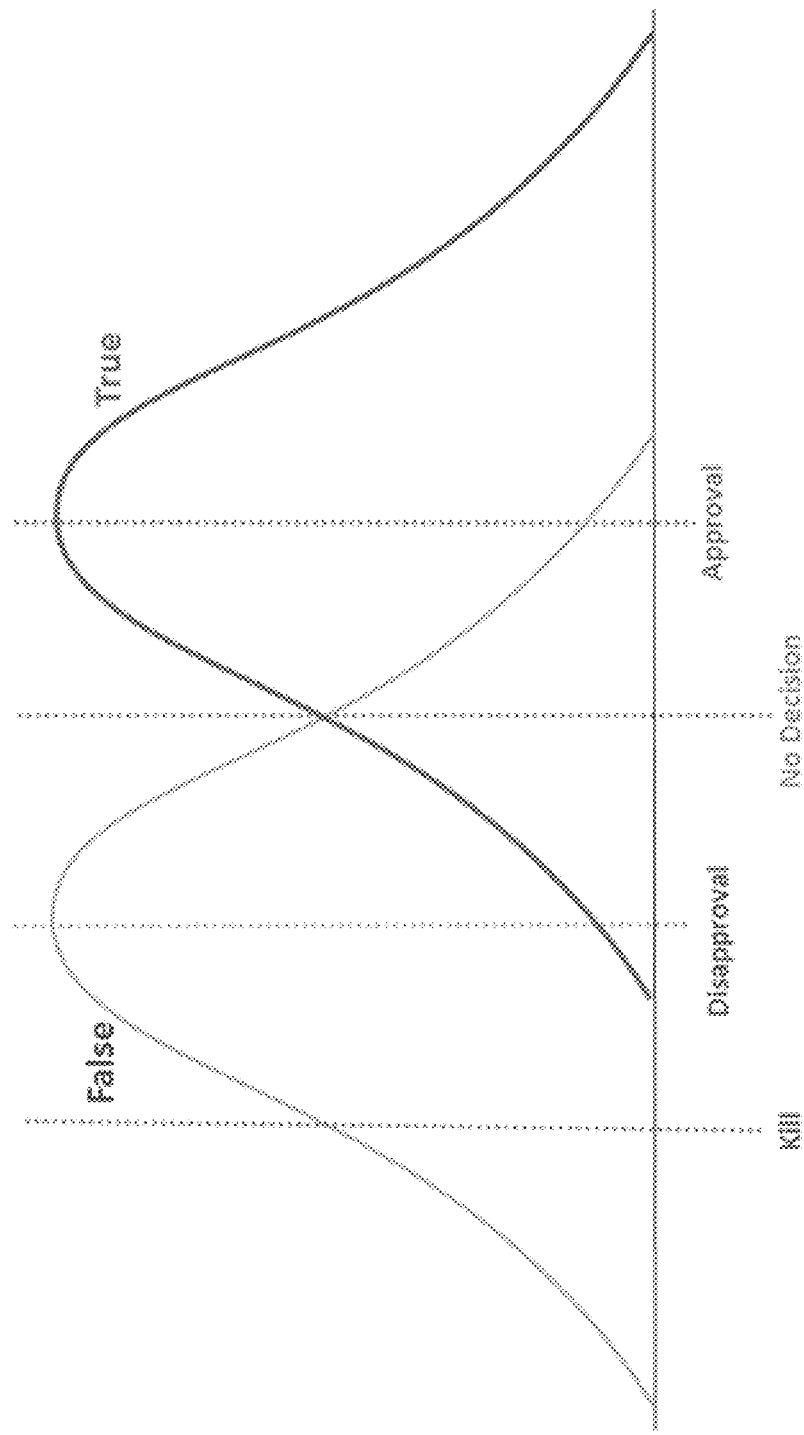

DETECTING VISUAL INFORMATION CORRESPONDING TO AN ANIMAL

CROSS REFERENCES TO RELATED APPLICATIONS

This application claims the benefit of priority of U.S. Provisional Application No. 62/261,598, filed Dec. 1, 2015, and U.S. Provisional Application No. 62/272,181, filed Dec. 29, 2015. Each of these applications is incorporated herein by reference in its entirety.

BACKGROUND

During the last few years camera based driver assistance systems (DAS) have been entering the market; including lane departure warning (LDW), automatic high-beam control (AHC), traffic sign recognition (TSR) forward collision warning (FCW) and pedestrian detection.

U.S. Patent Application Publication No. 2014/0285667 discloses a vehicle periphery monitoring device, which determines whether or not an animal detected by an imaging device is a high-risk animal that may possibly contact the vehicle. For example, compared with an animal in a posture with the head facing downwards, an animal in a posture with the head facing upwards is determined to be a high-risk animal which may suddenly bolt, so the latter animal is enclosed in a thick red frame and highlighted as a warning, and an alarm is emitted from speakers.

U.S. Patent Application Publication No. 2015/0123816 discloses a driving condition monitoring system and method that includes animal detecting components that detect presence of an animal, each located in a stationary mounting structure in a vicinity of the travel surface and apart from the travel surface, and a vehicle detecting sensor coupled to each animal detecting component and that is activated to detect the presence of a vehicle within a set distance therefrom only when the animal detecting component coupled to the vehicle detecting sensor detects the presence of an animal in the vicinity of the animal detecting component. A communication system is coupled to each animal detecting component and communicates directly to the vehicle or occupant thereof, the detected presence of an animal in the vicinity of the animal detecting component when the vehicle detecting sensor coupled to the animal detecting component detects the presence of a vehicle within the set distance from the vehicle detecting sensor.

U.S. Patent Application Publication No. 2014/0074359 discloses a safety system for a vehicle which is utilized as an animal detection system. By using an infrared camera and other sensors and/or cameras the safety system may detect an object in an area around the vehicle. A controller analyzes data from the sensors and/or cameras and determines if the object is an animal. If the object is determined to be an animal the controller initiates a response to avoid or minimize the chance of impacting the animal. A warning signal(s) is provided to the vehicle operator. A deterrent signal(s) is used to deter the animal from approaching the vehicle. Also, the animal detection system may send a signal to at least one other safety system for the vehicle to provide a crash avoidance response and/or to provide a crash preparation response.

U.S. Pat. No. 8,082,101 discloses techniques and methods of estimating a time to collision (TTC) to an object. Also disclosed are techniques and methods of determining whether a vehicle and a detected object are on a collision course. U.S. Pat. No. 8,082,101 is assigned to the assignee of the present application and is hereby incorporated by reference in its entirety.

SUMMARY

The disclosed embodiments relate to a system and method for detecting an animal in image data captured by a camera mountable in a vehicle.

In one aspect, the present disclosure is directed to a system for detecting an animal in a vicinity of a vehicle. The system includes at least one processor programmed to receive, from an image capture device, at least one image of the vicinity of the vehicle; analyze the at least one image using a truncated animal appearance template to detect visual information suspected to be associated with an animal, wherein the truncated animal appearance template corresponds to a portion of a body and one or more limbs of a suspected animal; and initiate a predefined vehicle response based on the detected visual information of the suspected animal in the at least one image.

In another aspect, the present disclosure is directed to a method of detecting an animal in a vicinity of a vehicle. The method includes receiving a plurality of images of the vicinity of the vehicle from one or more image capture devices; receiving a truncated animal appearance template, wherein the truncated animal appearance template corresponds to appearance of at least a portion of a body and one or more limbs of an animal without a shape of a head of the animal; processing the plurality of images using the truncated animal appearance template to detect, in at least one image from the plurality of images, visual information that corresponds to the truncated animal appearance template; and initiating a vehicle response when visual information corresponding to the truncated animal appearance template is detected in at least two images of the plurality of images.

In another aspect, the present disclosure is directed to a system for detecting an animal in a vicinity of a vehicle. The system includes a camera configured to acquire a plurality of images of the vicinity of the vehicle; a storage unit storing a truncated animal appearance template, wherein the truncated animal appearance template corresponds to an appearance of at least a portion of a body and limbs of an animal without a shape of a head of the animal; and a processor. The processor is configured to process the plurality of images to detect in at least one of the plurality of images visual information that corresponds to the truncated animal appearance template, and initiate a response when visual information corresponding to the truncated animal appearance template is detected in the at least one image.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate disclosed embodiments and, together with the description, serve to explain the disclosed embodiments. In the drawings:

FIG. 11A illustrates an exemplary probability plot of a Log Likelihood Ratio operator consistent with disclosed embodiments;

FIG. 11B illustrates an exemplary Log Likelihood Ratio classifier consistent with disclosed embodiments;

FIG. 13 illustrates an exemplary decision diagram consistent with disclosed embodiments.

DETAILED DESCRIPTION

Figure 1:
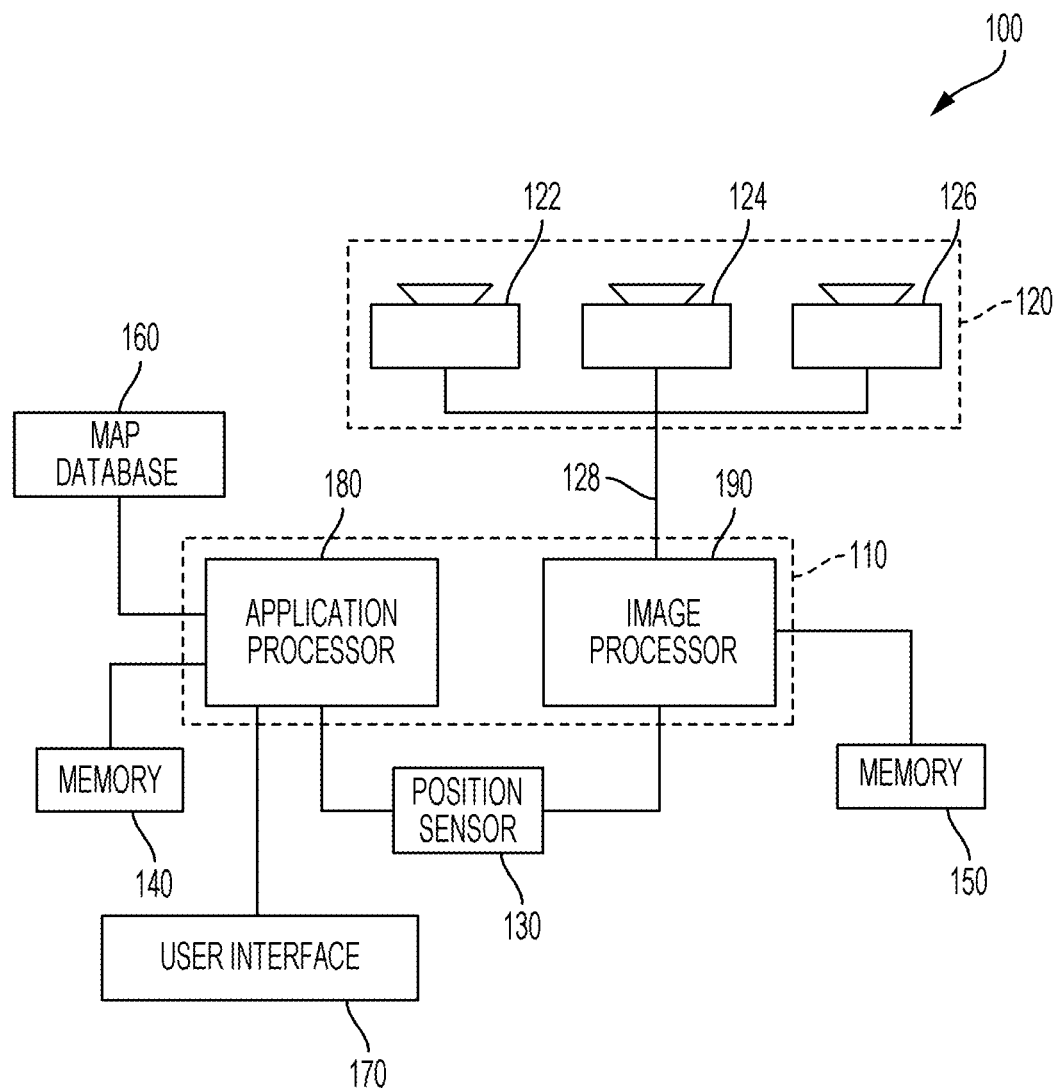
FIG. 1 is a block diagram of an imaging system consistent with disclosed embodiments.

The following detailed description refers to the accompanying drawings. Wherever possible, the same reference numbers are used in the drawings and the following description to refer to the same or similar parts. While several illustrative embodiments are described herein, modifications, adaptations and other implementations are possible. For example, substitutions, additions or modifications may be made to the components illustrated in the drawings, and the illustrative methods described herein may be modified by substituting, reordering, removing, or adding steps to the disclosed methods. Accordingly, the following detailed description is not limited to the disclosed embodiments and examples.

Disclosed embodiments provide systems and methods that can be used as part of or in combination with autonomous navigation and/or driver assist technology features. Driver assist technology refers to any suitable technology to assist drivers in the navigation and/or control of their vehicles, such as FCW, LDW and TSR, as opposed to fully autonomous driving. In various embodiments, the system may include one, two or more cameras mountable in a vehicle and an associated processor that monitors the environment of the vehicle. In further embodiments, additional types of sensors can be mounted in the vehicle and can be used in the autonomous navigation and/or driver assist system. In some embodiments, the system may provide techniques for detecting an animal on a roadway or in a vicinity of a roadway.

According to an aspect of the presently disclosed subject matter there is provided a method of and a system for detecting visual information corresponding to an animal. According to embodiments of the presently disclosed subject matter, a plurality of images can be obtained by an image acquisition unit mounted in a vehicle, optionally, while the vehicle is in motion. The plurality of images can be processed to determine whether visual information appearing in the images is suspected to be associated with an animal. It would be appreciated that a large animal that is located in or near a moving vehicle's path (e.g., the vehicle's estimated, projected or planned path) can pose a severe threat to occupants of the vehicle, as well as to the animal itself. Embodiments of the presently disclosed subject matter use a truncated animal appearance template to detect visual information appearing in the images that is suspected to be associated with an animal. According to embodiments of the presently disclosed subject matter, the truncated animal appearance template corresponds to an appearance of at least a portion of a body and/or limbs of the animal and does not include a shape of a head of the animal. Optionally, the truncated animal appearance template corresponds to an appearance of at least a portion of a body and/or limbs of the animal and does not include a shape of a head of the animal and does not include a shape of a tail of the animal. Additionally, the truncated animal appearance template may correspond to a representation or other characteristic of at least a portion of a body of an animal or a portion of limbs of animal, such as an outline or silhouette of at least a portion of a body or limbs of the animal.

It would be noted, that the truncated animal appearance template can be associated with specific types of animals that have specific characteristics. In one example, the truncated animal appearance template can correspond to a relatively large animal(s). Specifically, the truncated animal appearance template can correspond to an animal that can potentially cause significant damage to vehicle in case of an impact with the vehicle, at typical speeds and above, say at 50 Kilometers per hour or above. However, it would be appreciated that embodiments of the presently disclosed subject matter can be applied to any animal which can be represented using the proposed truncated animal appearance template.

Optionally, the truncated animal appearance template can correspond to an animal having proportions that is characterized by a predetermined torso size and/or a predetermined limbs size. In some embodiments, the predetermined torso size may be indicative of a relatively large torso and the predetermined limbs size may be indicative of relatively long limbs. In this description, an animal that is characterized by a relatively large torso and relatively long limbs is an animal whose mass is distributed such that on impact with a vehicle traveling at a typical speed, a substantial mass (the heavy body of the animal) would be thrown towards the windshield of the vehicle endangering those inside. This is the case, for example, when a significant mass of the animal is located above the point of impact with the car, which can cause, in case of an impact with a vehicle, the heavy body of the animal to be thrown towards the windshield of the vehicle. It would be appreciated that a majority of such animals are animals having relatively long limbs and a relatively large torso. Examples of animals for which a truncated animal appearance template can be generated and used in accordance with embodiments of the presently disclosed subject matter can include (but are not limited to): a Cow, a Deer, a Yak, a Llama, a Camel, an Ibex, a Moose, etc. Accordingly, in some embodiments, a predetermined torso size and a predetermined limbs size may include dimensions consistent with expected sizes of these and other similarly sized animals.

Still further by way of example, the truncated animal appearance template may correspond to an appearance of the animal from different angles. The truncated animal appearance template can correspond to an appearance of a truncated shape of the respective animal(s) when the animal's orientation relative to the camera is within a certain range. Generally, the different angles from which the torso and four limbs of the animal (or two pair of limbs) can be seen by a camera are angles in which the camera can capture an image that includes the animal's torso and two pairs of the animal legs. An angle from which a certain pair of legs appears as a single leg (because one leg obscures the other leg of the pair) can be considered valid or not. It would be appreciated that the camera can be mounted in or on the vehicle, say under the rear view mirror of the vehicle, at a location that provides a field of view that is similar to the driver's field of view or at any other location. Optionally, different truncated animal appearance templates can be generated for a given animal for day and night.

Still further by way of example, the truncated animal appearance template corresponds to appearance of the animal at different motion or movement states. For example, the animal appearance template corresponds to appearance of the animal while walking, running or when standing still.

Still further by way of example, the truncated animal appearance template corresponds to appearance of the animal when standing alone or when it is in the midst of a herd or any other animal grouping, where two or more animals are adjacent to one another.

According to embodiments of the presently disclosed subject matter, a plurality of truncated animal appearance templates can be provided. Still further by way of example, a truncated animal appearance template can be associated with a specific type, kind or species of animal or with specific ambient conditions (e.g., day and night). In other cases a truncated animal appearance template can be associated with more than one specific type of animal. A combination of truncated animal appearance templates can also be used, where some templates can be used to detect only one specific type, kind or species of animal whereas others can be used to detect more than one specific type, kind or species of animal.

It would be appreciated that detecting visual information which corresponds to an animal can include using one or more classification operations. According to embodiments of the presently disclosed subject matter, one or more classifiers can be used to determine if visual information appearing in the image is suspected to be associated with an animal. For example, the class separator that is implemented by a certain classifier can be based on the truncated animal appearance template. By way of example, a truncated animal appearance template, and possibly also a respective classifier, can be based on a derivative(s) of a truncated animal appearance in an image. Optionally, the animal detection process can involve application of different truncated animal appearance templates, and possibly using several respective classifiers. Optionally, the animal detection process can implement a relatively relaxed initial classification process, which typically produces a relatively large set of suspected animal candidates, followed by a (one or more) more restrictive classification operation(s) which is (are) applied to the suspected animal candidates, and reduces the sets of candidate or suspected animals in the image or in a stream of images. Each of the initial classification process and the subsequent suspected animal candidates reduction process can involve one, two or more different classifiers, and can include one, two or more iterations.

It would be appreciated that using the proposed truncated animal appearance template in accordance with embodiments of the presently disclosed subject matter can contribute to a low rate of false positives, and optionally, contribute to a high rate of successful detections (true positives). It would be appreciated that using the proposed truncated animal appearance template in accordance with embodiments of the presently disclosed subject matter can also contribute towards an efficient animal detection process.

Still further by way of example, the animal detection process can include processing a current frame (image) in a video stream (a plurality of images) to detect visual information appearing in the current frame which is suspected to be associated with an animal, and evaluating consistency between the visual information appearing in the current frame which is suspected to be associated with an animal with visual information in one or more previous frames which is suspected to be associated with an animal (or possibly with the same animal). Optionally, the detection process can conclude that visual information that is suspected to be associated with an animal is an image of an animal when visual information that is suspected to be associated with an animal consistently appears across a plurality of images. Further by way of example, the detection process can trigger a predefined response to animal detection when visual information that is suspected to be associated with an animal consistently appears across a plurality of images. Examples of technical measures that can be used to evaluate consistency, and particularly consistency between the visual information appearing in the current frame, which is suspected to be associated with an animal, with visual information in one or more previous frames, which is suspected to be associated with an animal (or possibly with the same animal), are described below.

Before discussing in detail examples of features of the animal detection process, there is provided a description of various possible implementations and configurations of a vehicle mountable system that can be used for detecting animals. Optionally, various embodiments of the system can be mounted in a vehicle, and can be operated while the vehicle is in motion. Optionally, the system can implement the animal detection process according to embodiments of the presently disclosed subject matter, to detect animals, or visual information that is suspected to be associated with animals, located in or near the vehicle's path (e.g., the vehicle's estimated, projected or planned path).

FIG. 1, to which reference is now made, is a block diagram representation of a system according to embodiments of the presently disclosed subject matter. System 100 can include various components depending on the requirements of a particular implementation. In some embodiments, system 100 can include a processing unit 110, an image acquisition unit 120 and one or more memory units 140, 150. Processing unit 110 can include one or more processing devices. In some embodiments, processing unit 110 can include an application processor 180, an image processor 190, or any other suitable processing device. Similarly, image acquisition unit 120 can include any number of image acquisition devices and components depending on the requirements of a particular application. In some embodiments, image acquisition unit 120 can include one or more image capture devices (e.g., cameras), such as image capture device 122, image capture device 124, and image capture device 126. Optionally, system 100 can also include a data interface 128 communicatively connecting processing unit 110 to image acquisition device 120. For example, data interface 128 can include any wired and/or wireless link or links for transmitting image data acquired by image acquisition device 120 to processing unit 110.

Both application processor 180 and image processor 190 can include various types of processing devices. For example, either or both of application processor 180 and image processor 190 can include one or more microprocessors, preprocessors (such as image preprocessors), graphics processors, central processing units (CPUs), support circuits, digital signal processors, integrated circuits, memory, or any other types of devices suitable for running applications and for image processing and analysis. In some embodiments, application processor 180 and/or image processor 190 can include any type of single or multi-core processor, mobile device microcontroller, central processing unit, etc. Various processing devices can be used, including, for example, processors available from manufacturers such as Intel®, AMD®, etc. and can include various architectures (e.g., x86 processor, ARM®, etc.).

Optionally, application processor 180 and/or image processor 190 can include any of the EyeQ series of processor chips available from Mobileye®. These processor designs each include multiple processing units with local memory and instruction sets. Such processors may include video inputs for receiving image data from multiple image sensors and may also include video output capabilities. In one example, the EyeQ2® uses 90 nm-micron technology operating at 332 Mhz. The EyeQ2® architecture has two floating point, hyper-thread 32-bit RISC CPUs (MIPS32® 34K® cores), five Vision Computing Engines (VCE), three Vector Microcode Processors (VMP®), Denali 64-bit Mobile DDR Controller, 128-bit internal Sonics Interconnect, dual 16-bit Video input and 18-bit Video output controllers, 16 channels DMA and several peripherals. The MIPS34K CPU manages the five VCEs, three VMP® and the DMA, the second MIPS34K CPU and the multi-channel DMA as well as the other peripherals. The five VCEs, three VMP® and the MIPS34K CPU can perform intensive vision computations required by multi-function bundle applications. In another example, the EyeQ3®, which is a third generation processor and is six times more powerful than the EyeQ2®, can be used in the disclosed embodiments.

While FIG. 1 depicts two separate processing devices included in processing unit 110, more or fewer processing devices can be used. For example, in some embodiments, a single processing device may be used to accomplish the tasks of application processor 180 and image processor 190. In other embodiments, these tasks can be performed by more than two processing devices.

Processing unit 110 can include various types of devices. For example, processing unit 110 may include various devices, such as a controller, an image preprocessor, a central processing unit (CPU), support circuits, digital signal processors, integrated circuits, memory, or any other types of devices for image processing and analysis. The image preprocessor can include a video processor for capturing, digitizing, and processing the imagery from the image sensors. The CPU can include any number of microcontrollers or microprocessors. The support circuits can be any number of circuits generally well known in the art, including cache, power supply, clock and input-output circuits. The memory can store software that, when executed by the processor, controls the operation of the system. The memory can include databases and image processing software. The memory can include any number of random access memories, read only memories, flash memories, disk drives, optical storage, removable storage and other types of storage. In one instance, the memory can be separate from the processing unit 110. In another instance, the memory can be integrated into the processing unit 110.

Each memory 140, 150 can include software instructions that when executed by a processor (e.g., application processor 180 and/or image processor 190), can control operation of various aspects of system 100. These memory units can include various databases and image processing software. The memory units can include random access memory, read only memory, flash memory, disk drives, optical storage, tape storage, removable storage and/or any other types of storage. In some embodiments, memory units 140, 150 can be separate from the application processor 180 and/or image processor 190. In other embodiments, these memory units can be integrated into application processor 180 and/or image processor 190.

Optionally, the system 100 can include a position sensor 130. The position sensor 130 can include any type of device suitable for determining a location associated with at least one component of system 100. In some embodiments, position sensor 130 can include a GPS receiver. Such receivers can determine a user position and velocity by processing signals broadcasted by global positioning system satellites. Position information from position sensor 130 can be made available to application processor 180 and/or image processor 190.

Optionally, the system 100 can be operatively connectible to various systems, devices and units onboard a vehicle in which the system 100 can be mounted, and through any suitable interfaces (e.g., a communication bus) the system 100 can communicate with the vehicle's systems. Examples of vehicle systems with which the system 100 can cooperate include: a throttling system, a braking system, and a steering system.

Optionally, the system 100 can include a user interface 170. User interface 170 can include any device suitable for providing information to or for receiving inputs from one or more users of system 100. In some embodiments, user interface 170 can include user input devices, including, for example, a touchscreen, microphone, keyboard, pointer devices, track wheels, cameras, knobs, buttons, etc. With such input devices, a user may be able to provide information inputs or commands to system 100 by typing instructions or information, providing voice commands, selecting menu options on a screen using buttons, pointers, or eyetracking capabilities, or through any other suitable techniques for communicating information to system 100. Information can be provided by the system 100, through the user interface 170, to the user in a similar manner.

Optionally, the system 100 can include a map database 160. The map database 160 can include any type of database for storing digital map data. In some embodiments, map database 160 can include data relating to a position, in a reference coordinate system, of various items, including roads, water features, geographic features, points of interest, etc. Map database 160 can store not only the locations of such items, but also descriptors relating to those items, including, for example, names associated with any of the stored features. In some embodiments, map database 160 can be physically located with other components of system 100. Alternatively or additionally, map database 160 or a portion thereof can be located remotely with respect to other components of system 100 (e.g., processing unit 110). In such embodiments, information from map database 160 can be downloaded over a wired or wireless data connection to a network (e.g., over a cellular network and/or the Internet, etc.).

Image capture devices 122, 124, and 126 can each include any type of device suitable for capturing at least one image from an environment. Moreover, any number of image capture devices can be used to acquire images for input to the image processor. Some embodiments of the presently disclosed subject matter can include or can be implemented with only a single image capture device, while other embodiments can include or can be implemented with two, three, or even four or more image capture devices. Image capture devices 122, 124, and 126 will be further described with reference to FIGS. 2B-2E, below.

It would be appreciated that the system 100 can include or can be operatively associated with other types of sensors, including for example: an acoustic sensor, a RF sensor (e.g., radar transceiver), and a LIDAR sensor. Such sensors can be used independently of or in cooperation with the image acquisition device 120. For example, the data from the radar system (not shown) can be used for validating the processed information that is received from processing images acquired by the image acquisition device 120, e.g., to filter certain false positives resulting from processing images acquired by the image acquisition device 120.

Figure 2A:
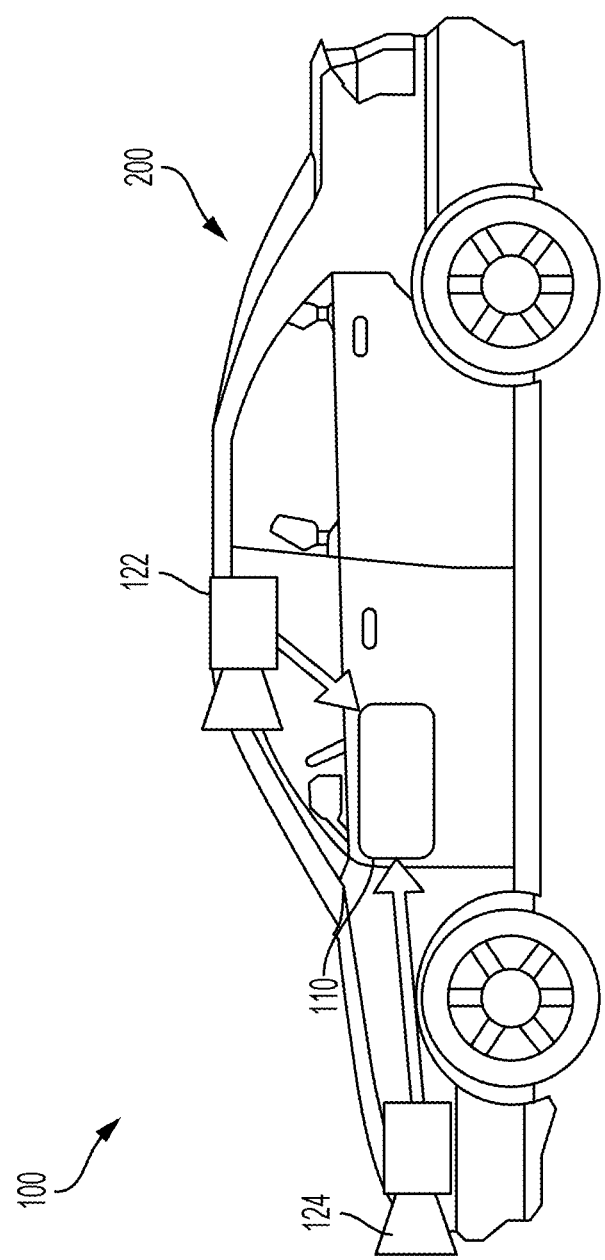
FIG. 2A is a side-view illustration of a vehicle imaging system consistent with disclosed embodiments.

System 100, or various components thereof, can be incorporated into various different platforms. In some embodiments, system 100 may be included on a vehicle 200, as shown in FIG. 2A. For example, vehicle 200 can be equipped with a processing unit 110 and any of the other components of system 100, as described above relative to FIG. 1. While in some embodiments vehicle 200 can be equipped with only a single image capture device (e.g., camera), in other embodiments, such as those discussed in connection with FIGS. 2B-2E, multiple image capture devices can be used. For example, either of image capture devices 122 and 124 of vehicle 200, as shown in FIG. 2A, can be part of an ADAS (Advanced Driver Assistance Systems) imaging set.

The image capture devices included on vehicle 200 as part of the image acquisition unit 120 can be positioned at any suitable location. In some embodiments, as shown in FIGS. 2A-2E and 3A-3C, image capture device 122 may be located in the vicinity of the rearview mirror. This position may provide a line of sight similar to that of the driver of vehicle 200, which can aid in determining what is and is not visible to the driver.

Other locations for the image capture devices of image acquisition unit 120 can also be used. For example, image capture device 124 can be located on or in a bumper of vehicle 200. Such a location can be especially suitable for image capture devices having a wide field of view. The line of sight of bumper-located image capture devices can be different from that of the driver. The image capture devices (e.g., image capture devices 122, 124, and 126) can also be located in other locations. For example, the image capture devices may be located on or in one or both of the side mirrors of vehicle 200, on the roof of vehicle 200, on the hood of vehicle 200, on the trunk of vehicle 200, on the sides of vehicle 200, mounted on, positioned behind, or positioned in front of any of the windows of vehicle 200, and mounted in or near light figures on the front and/or back of vehicle 200, etc. The image acquisition unit 120, or an image capture device that is one of a plurality of image capture devices that are used in an image acquisition unit 120, can have a FOV that is different than the FOV of a driver of a vehicle, and not always see the same objects. In one example, the FOV of the image acquisition unit 120 can extend beyond the FOV of a typical driver and can thus detect and/or track objects which are outside the FOV of the driver. In yet another example, the FOV of the image acquisition unit 120 is some portion of the FOV of the driver, optionally, the FOV of the image acquisition unit 120 corresponding to a sector in which a detection of a presence of obstructions, and in particular animals, can assist the driver or can be utilized by an autonomous vehicle system or feature to react to a detected object or hazard.

In addition to image capture devices, vehicle 200 can include various other components of system 100. For example, processing unit 110 may be included on vehicle 200 either integrated with or separate from an engine control unit (ECU) of the vehicle. Vehicle 200 may also be equipped with a position sensor 130, such as a GPS receiver and may also include a map database 160 and memory units 140 and 150.

Figure 2B:
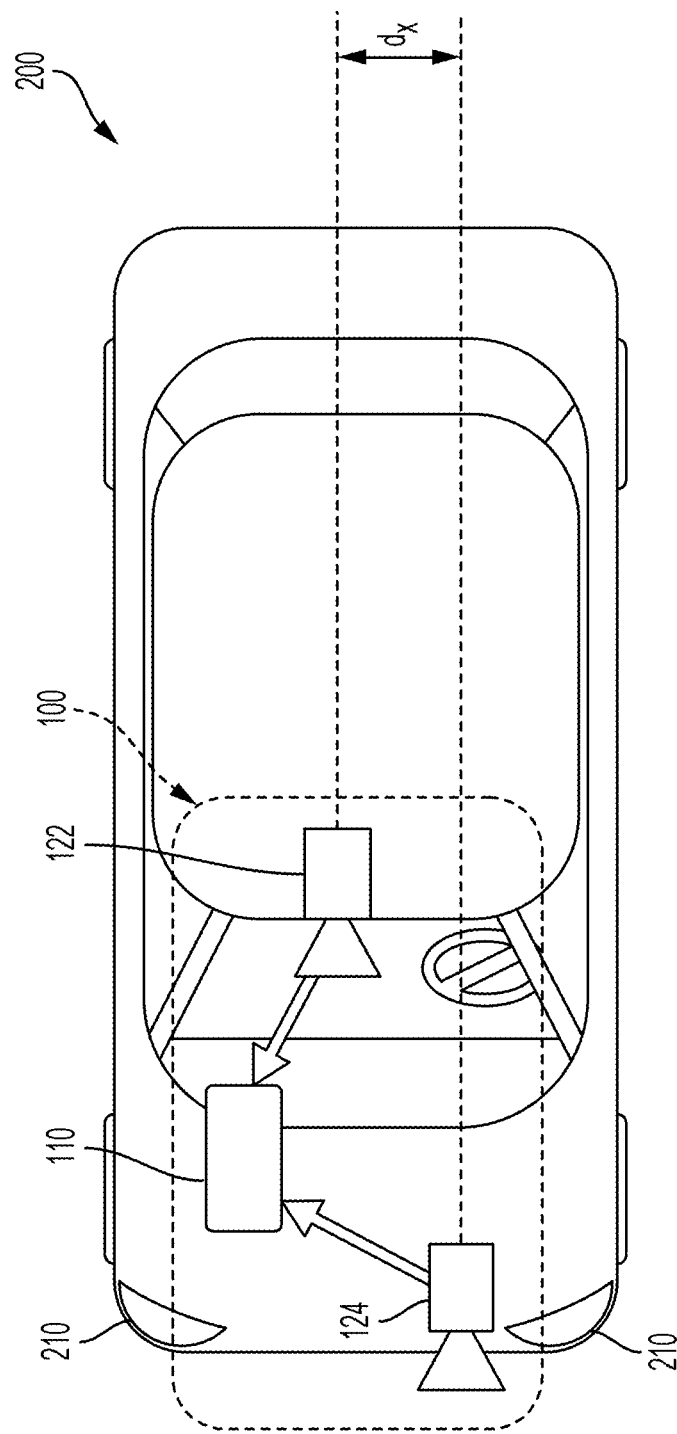
FIG. 2B is a top-view illustration of a vehicle imaging system consistent with disclosed embodiments.

FIG. 2A is a diagrammatic side view representation of a vehicle imaging system according to embodiments of the presently disclosed subject matter. FIG. 2B is a diagrammatic top view illustration of the embodiment shown in FIG. 2A. As illustrated in FIG. 2B, the disclosed embodiments can include a vehicle 200 including in its body a system 100 with a first image capture device 122 positioned in the vicinity of the rearview mirror and/or near the driver of vehicle 200, a second image capture device 124 positioned on or in a bumper region (e.g., one of bumper regions 210) of vehicle 200, and a processing unit 110.

Figure 2C:
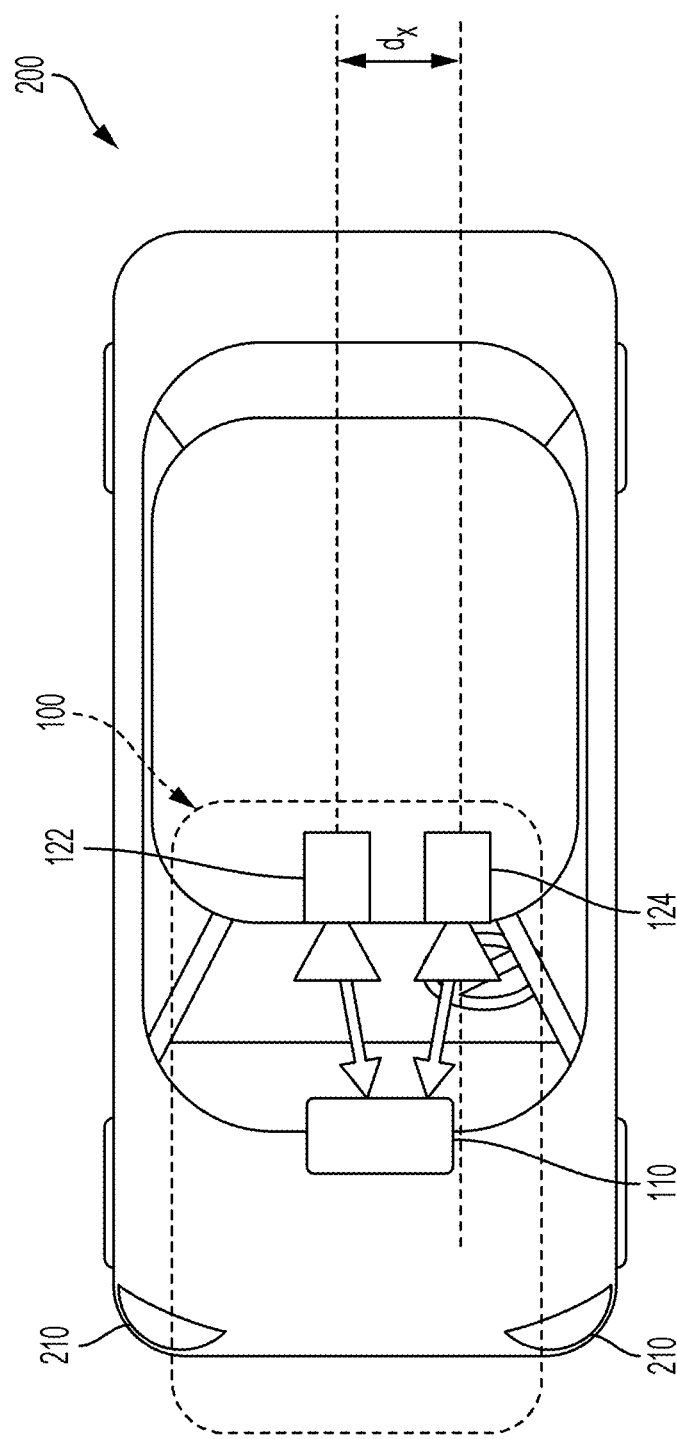
FIG. 2C is a top-view illustration of a vehicle imaging system consistent with disclosed embodiments.

As illustrated in FIG. 2C, image capture devices 122 and 124 may both be positioned in the vicinity of the rearview mirror and/or near the driver of vehicle 200. Additionally, while two image capture devices 122 and 124 are shown in FIGS. 2B and 2C, it should be understood that other embodiments may include more than two image capture devices. For example, in the embodiments shown in FIGS. 2D and 2E, first, second, and third image capture devices 122, 124, and 126, are included in the system 100 of vehicle 200.

Figure 2D:
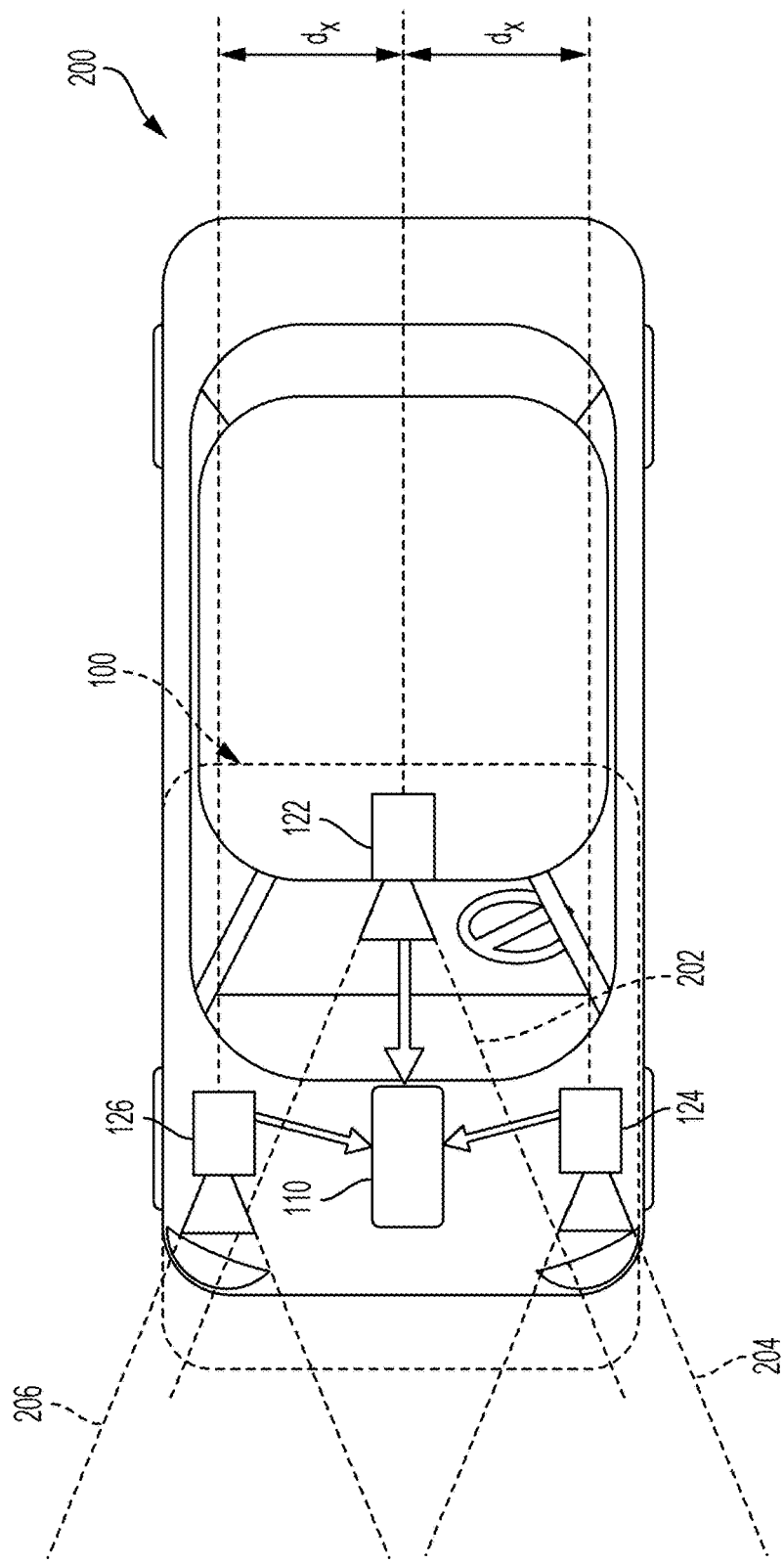
FIG. 2D is a top-view illustration of a vehicle imaging system consistent with disclosed embodiments.
Figure 2E:
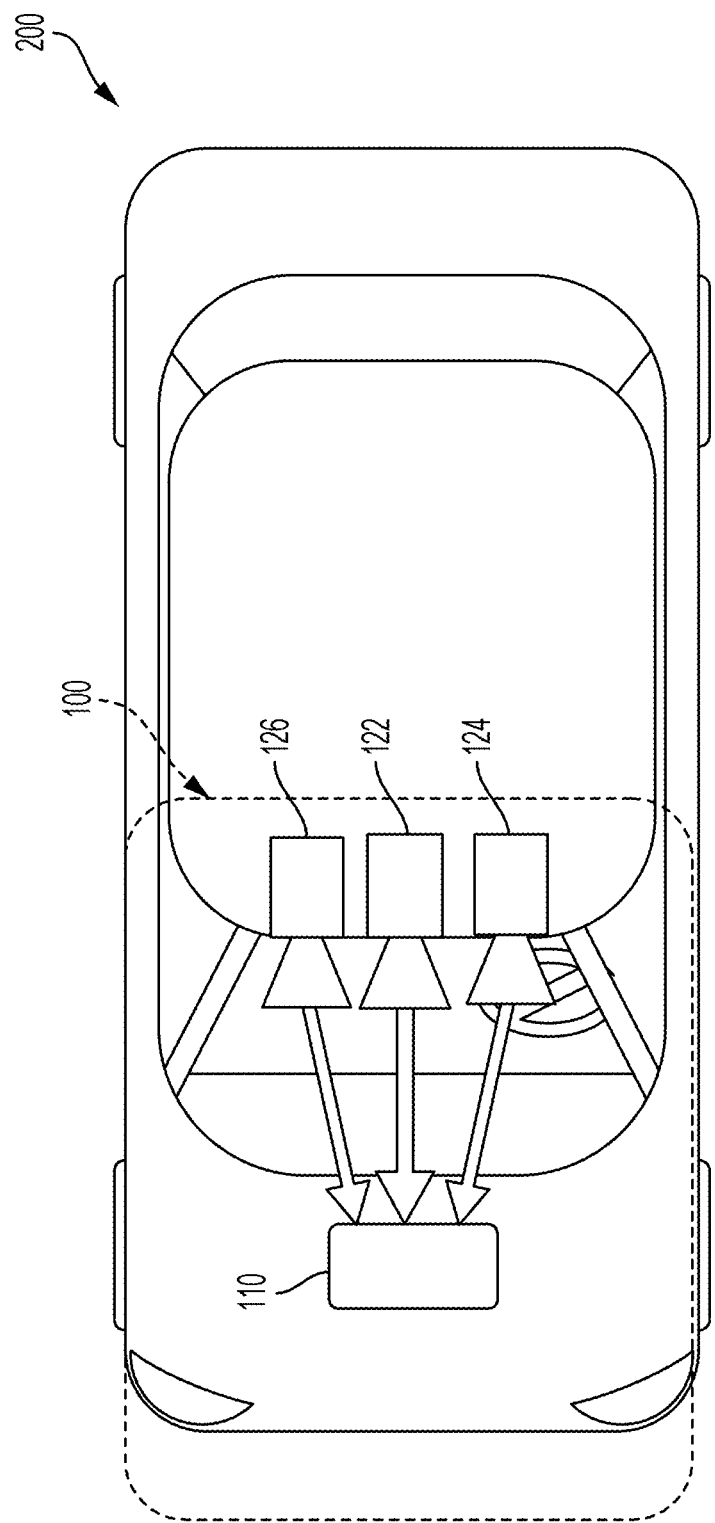
FIG. 2E is a top-view illustration of a vehicle imaging system consistent with disclosed embodiments.

As illustrated in FIG. 2D, image capture device 122 may be positioned in the vicinity of the rearview mirror and/or near the driver of vehicle 200, and image capture devices 124 and 126 may be positioned on or in a bumper region (e.g., one of bumper regions 210) of vehicle 200. And as shown in FIG. 2E, image capture devices 122, 124, and 126 may be positioned in the vicinity of the rearview mirror and/or near the driver seat of vehicle 200. The disclosed embodiments are not limited to any particular number and configuration of the image capture devices, and the image capture devices may be positioned in any appropriate location within and/or on vehicle 200.

It is also to be understood that the disclosed embodiments are not limited to a particular type of vehicle 200 and may be applicable to all types of vehicles including automobiles, trucks, trailers, motorcycles, bicycles, self-balancing transport devices and other types of vehicles.

The first image capture device 122 can include any suitable type of image capture device. Image capture device 122 can include an optical axis. In one instance, the image capture device 122 can include an Aptina M9V024 WVGA sensor with a global shutter. In another example, a rolling shutter sensor can be used. Image acquisition unit 120, and any image capture device which is implemented as part of the image acquisition unit 120, can have any desired image resolution. For example, image capture device 122 can provide a resolution of 1280×960 pixels and can include a rolling shutter.

Image acquisition unit 120, and any image capture device which is implemented as part of the image acquisition unit 120, can include various optical elements. In some embodiments one or more lenses can be included, for example, to provide a desired focal length and field-of-view (FOV) for the image acquisition unit 120, and for any image capture device which is implemented as part of the image acquisition unit 120. In some embodiments, an image capture device which is implemented as part of the image acquisition unit 120 can include or be associated with any optical elements, such as a 6 mm lens or a 12 mm lens, for example. In some embodiments, image capture device 122 can be configured to capture images having a desired FOV 202, as illustrated in FIG. 2D.

The first image capture device 122 may have a scan rate associated with acquisition of each of the first series of image scan lines. The scan rate may refer to a rate at which an image sensor can acquire image data associated with each pixel included in a particular scan line.

Figure 2F:
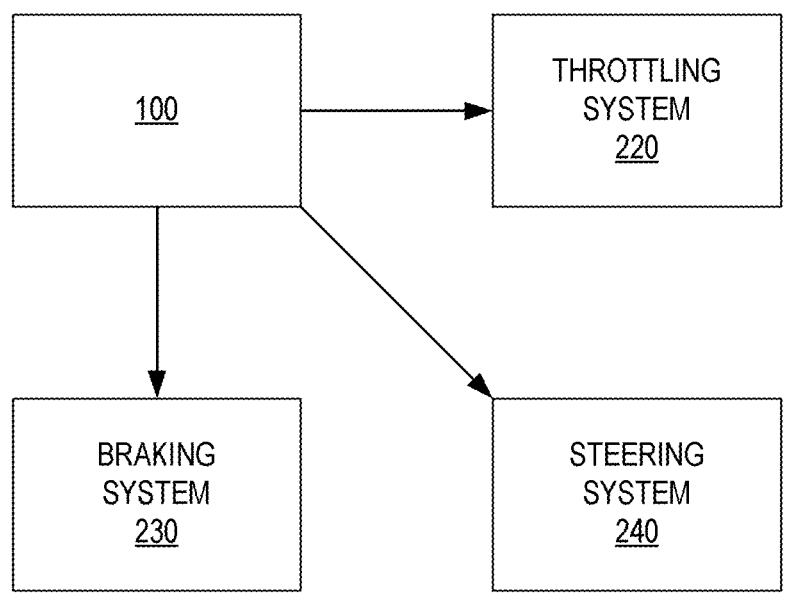
FIG. 2F is a block diagram of vehicle control systems consistent with disclosed embodiments.

FIG. 2F is a diagrammatic representation of vehicle control systems, according to embodiments of the presently disclosed subject matter. As indicated in FIG. 2F, vehicle 200 can include throttling system 220, braking system 230, and steering system 240. System 100 can provide inputs (e.g., control signals) to one or more of throttling system 220, braking system 230, and steering system 240 over one or more data links (e.g., any wired and/or wireless link or links for transmitting data). For example, based on analysis of images acquired by image capture devices 122, 124, and/or 126, system 100 can provide control signals to one or more of throttling system 220, braking system 230, and steering system 240 to navigate vehicle 200 (e.g., by causing an acceleration, a turn, a lane shift, etc.). Further, system 100 can receive inputs from one or more of throttling system 220, braking system 230, and steering system 240 indicating operating conditions of vehicle 200 (e.g., speed, whether vehicle 200 is braking and/or turning, etc.).

Figure 3A:
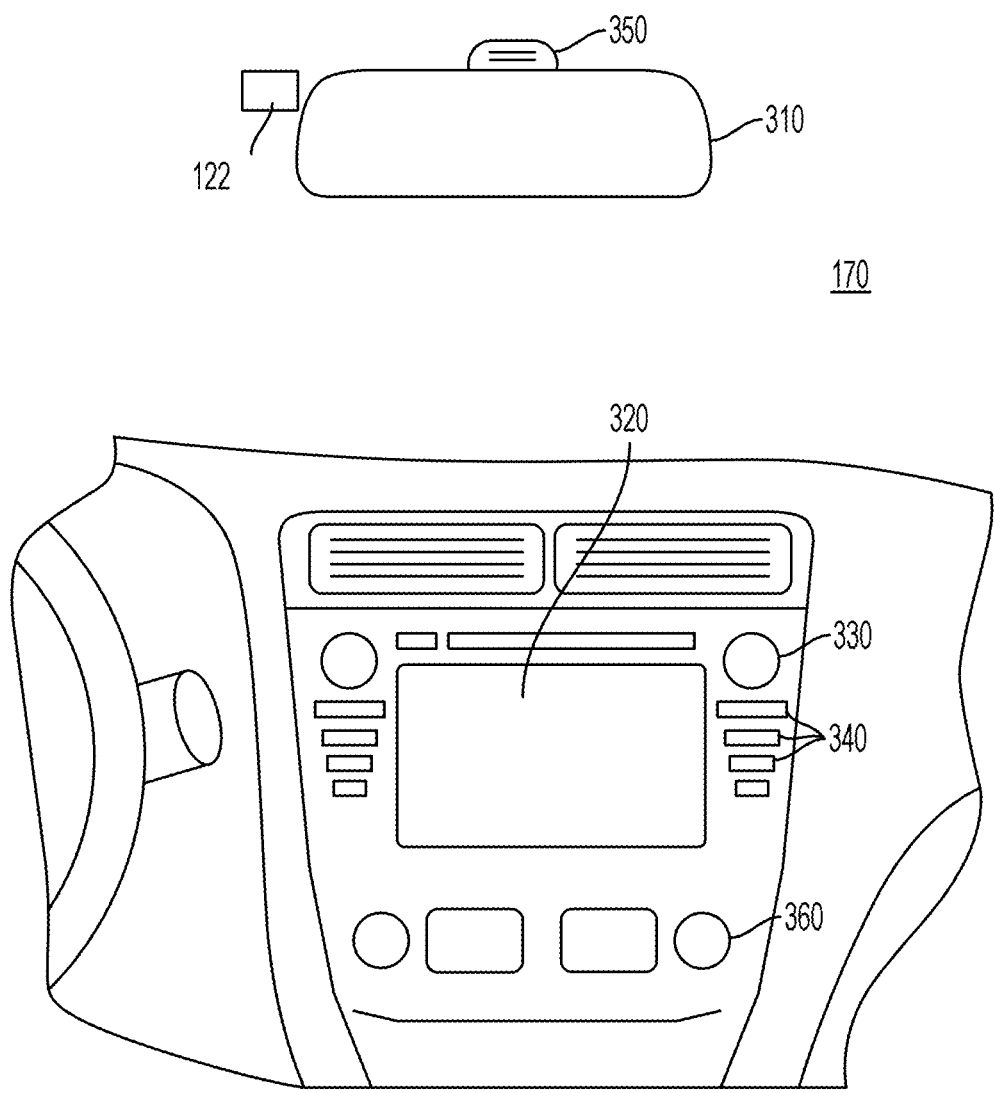
FIG. 3A is a diagrammatic representation of an interior of a vehicle including a rearview mirror and a user interface for a vehicle imaging system consistent with the disclosed embodiments.

As shown in FIG. 3A, vehicle 200 can also include a user interface 170 for interacting with a driver or a passenger of vehicle 200. For example, user interface 170 in a vehicle application can include a touch screen 320, knobs 330, buttons 340, and a microphone 350. A driver or passenger of vehicle 200 can also use handles (e.g., located on or near the steering column of vehicle 200 including, for example, turn signal handles), buttons (e.g., located on the steering wheel of vehicle 200), and the like, to interact with system 100. In some embodiments, microphone 350 can be positioned adjacent to a rearview mirror 310. Similarly, in some embodiments, image capture device 122 can be located near rearview mirror 310. In some embodiments, user interface 170 can also include one or more speakers 360 (e.g., speakers of a vehicle audio system). For example, system 100 can provide various notifications (e.g., alerts) via speakers 360 or via vibrating elements incorporated into vehicle parts which are in contact with the driver (e.g., the car seat, the steering wheel, etc.).

Figure 3B:
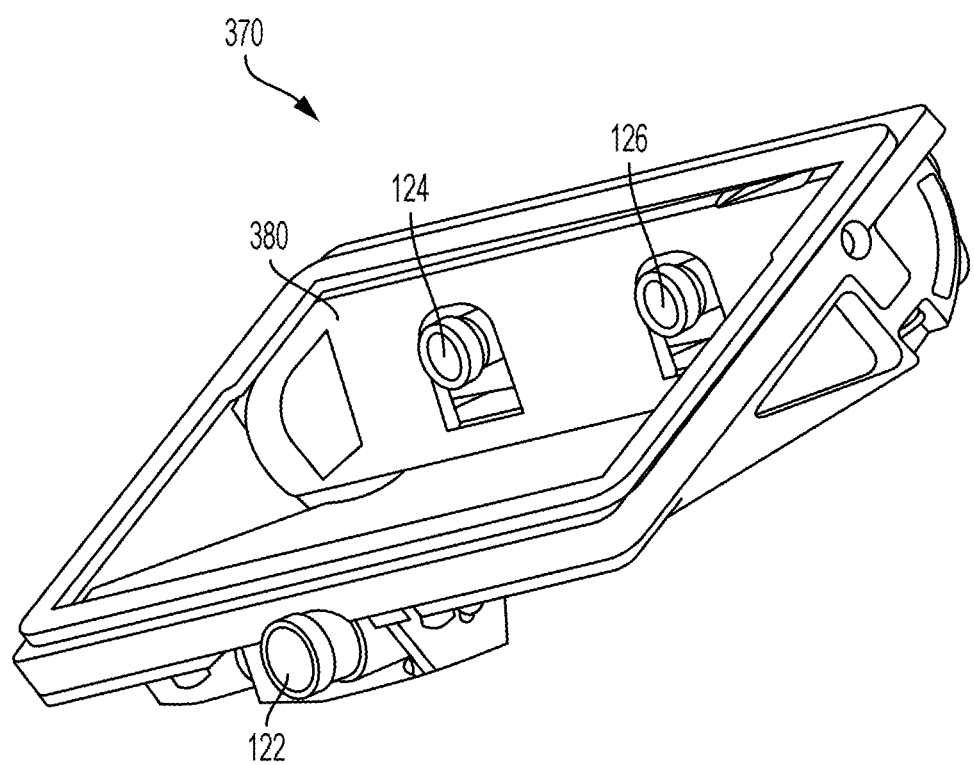
FIG. 3B is an illustration of an example of a camera mount that is configured to be positioned behind a rearview mirror and against a vehicle windshield consistent with the disclosed embodiments.
Figure 3C:
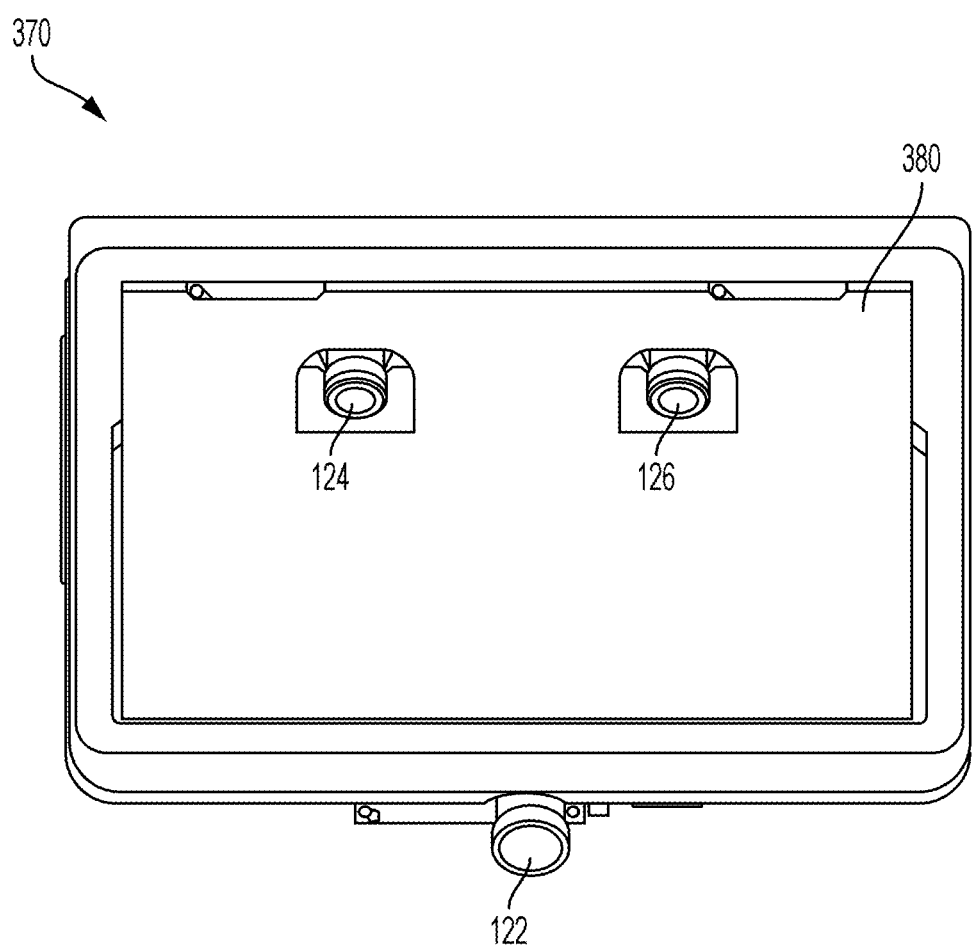
FIG. 3C is an illustration of the camera mount shown in FIG. 3B from a different perspective consistent with the disclosed embodiments.
Figure 3D:
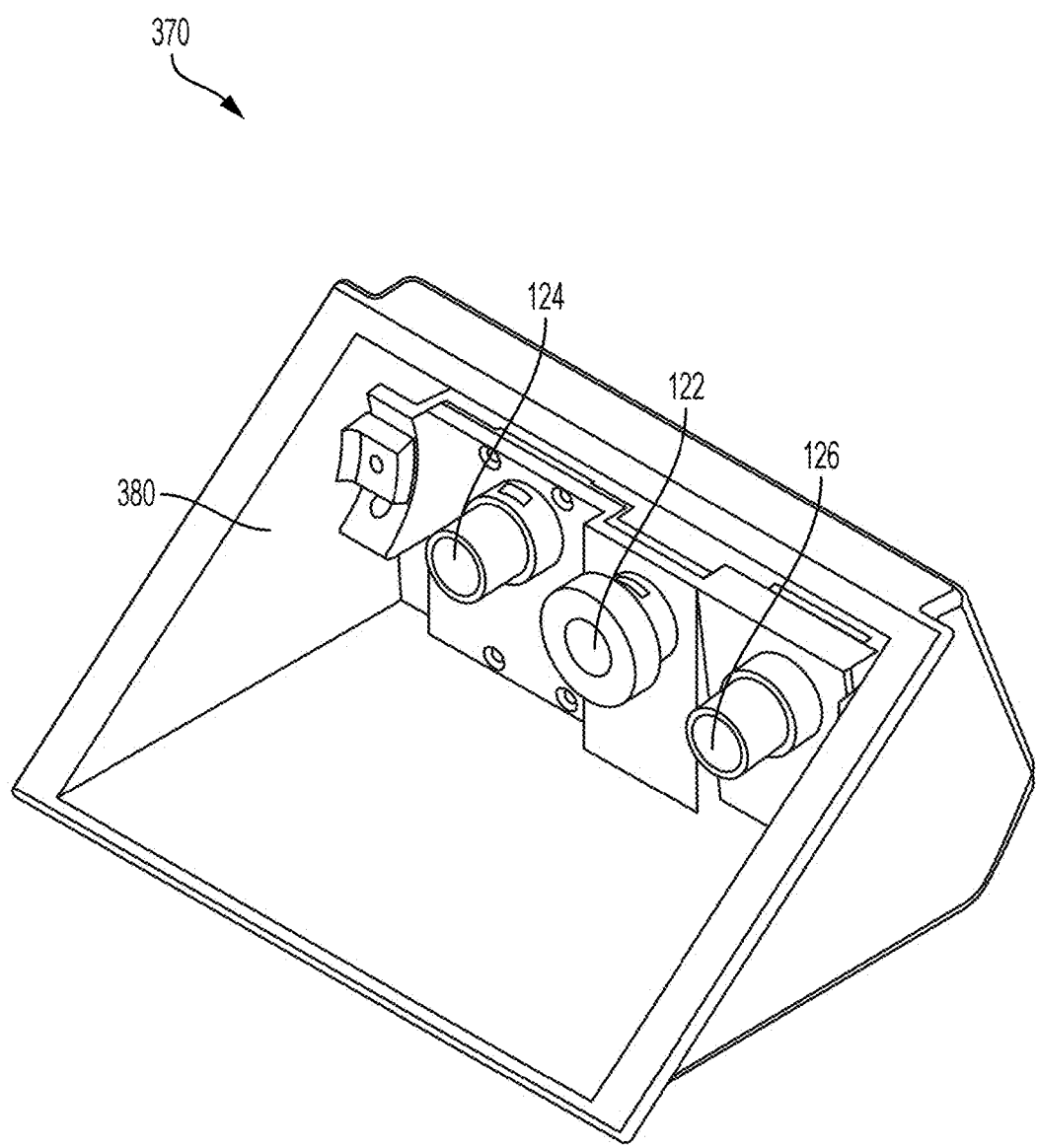
FIG. 3D is an illustration of an example of a camera mount that is configured to be positioned behind a rearview mirror and against a vehicle windshield consistent with the disclosed embodiments.

FIGS. 3B-3D are illustrations of an exemplary camera mount 370 configured to be positioned behind a rearview mirror (e.g., rearview mirror 310) and against a vehicle windshield, consistent with disclosed embodiments. As shown in FIG. 3B, camera mount 370 may include image capture devices 122, 124, and 126. Image capture devices 124 and 126 may be positioned behind a glare shield 380, which may be flush against the vehicle windshield and include a composition of film and/or anti-reflective materials. For example, glare shield 380 may be positioned such that it aligns against a vehicle windshield having a matching slope. In some embodiments, each of image capture devices 122, 124, and 126 may be positioned behind glare shield 380, as depicted, for example, in FIG. 3D. The disclosed embodiments are not limited to any particular configuration of image capture devices 122, 124, and 126, camera mount 370, and glare shield 380. FIG. 3C is an illustration of camera mount 370 shown in FIG. 3B from a front perspective.

As will be appreciated by a person skilled in the art having the benefit of this disclosure, numerous variations and/or modifications can be made to the foregoing disclosed embodiments. For example, not all components are essential for the operation of system 100. Further, any component can be located in any appropriate part of system 100 and the components can be rearranged into a variety of configurations while providing the functionality of the disclosed embodiments. Therefore, the foregoing configurations are examples and, regardless of the configurations discussed above, system 100 can provide a wide range of functionality to analyze the surroundings of vehicle 200 and navigate vehicle 200 or alert a user of the vehicle in response to the analysis.

As discussed below in further detail and according to embodiments of the presently disclosed subject matter, system 100 may provide a variety of features related to autonomous driving and/or driver assist technology. For example, system 100 can analyze image data, position data (e.g., GPS location information), map data, speed data, and/or data from sensors included in vehicle 200. System 100 may collect the data for analysis from, for example, image acquisition unit 120, position sensor 130, and other sensors. Further, system 100 can analyze the collected data to determine whether or not vehicle 200 should take a certain action, and then automatically take the determined action without human intervention or it can provide a warning, alert or instruction which can indicate to a driver that a certain action needs to be taken. For example, when vehicle 200 navigates without human intervention, system 100 may automatically control the braking, acceleration, and/or steering of vehicle 200 (e.g., by sending control signals to one or more of throttling system 220, braking system 230, and steering system 240). Further, system 100 can analyze the collected data and issue warnings and/or alerts to vehicle occupants based on the analysis of the collected data.

Figure 4:
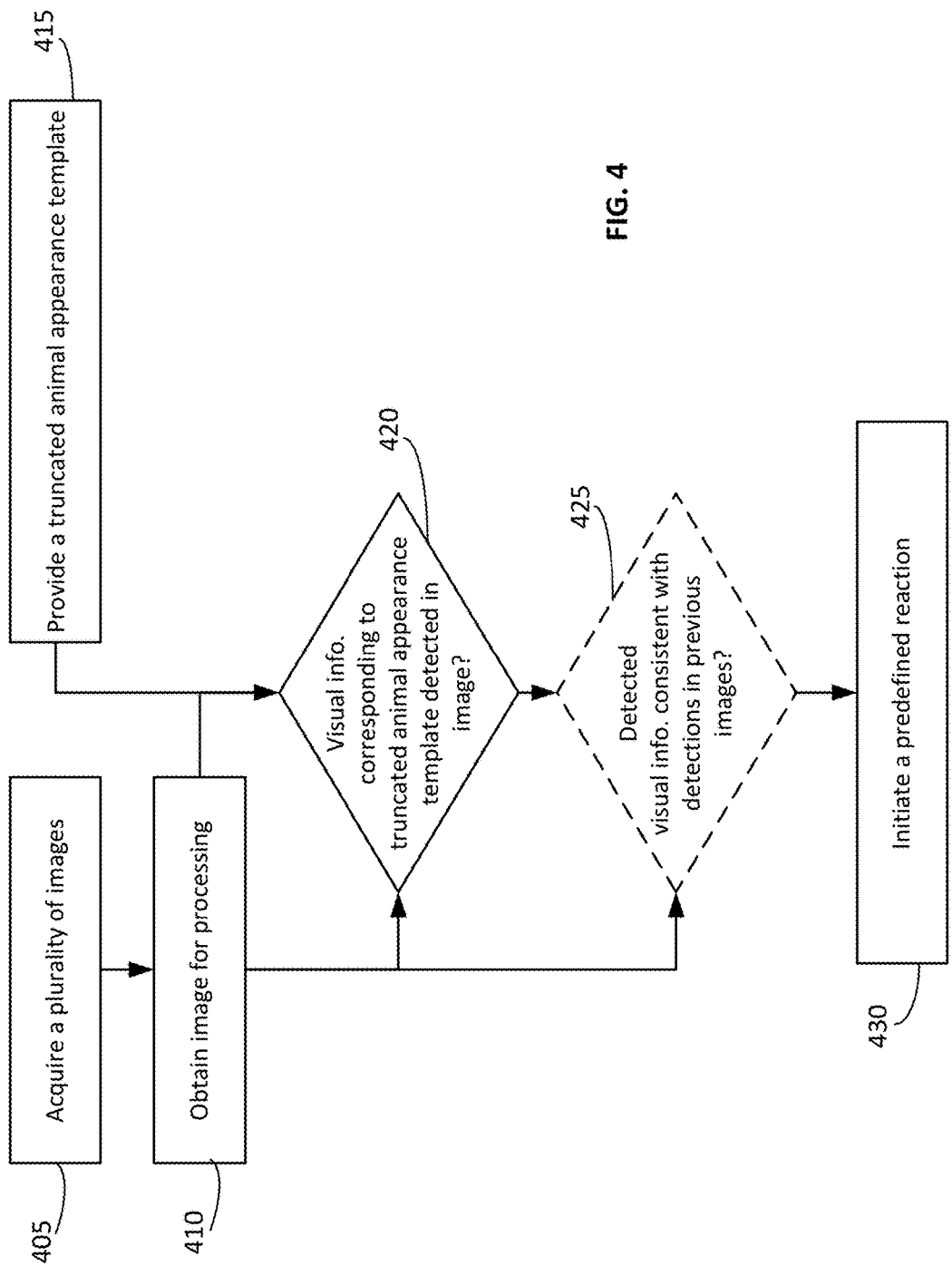
FIG. 4 is a flowchart of an animal detection method consistent with disclosed embodiments.

Referring now to FIG. 4, there is shown a flowchart illustration of a method of detecting visual information corresponding to an animal, according to embodiments of the presently disclosed subject matter. According to embodiments of the presently disclosed subject matter, a plurality of images of an environment of a vehicle can be acquired (block 405). The images can be acquired using an image acquisition unit mounted in the vehicle. Any suitable image acquisition unit can be used, including for example any of the embodiments illustrated in FIGS. 1-3 and described above with reference thereto. By way of example, the images are captured as a stream of video frames. The images can be captured in a forward direction of the vehicle, and while the vehicle is in motion. Still further by way of example, the image acquisition unit can be configured to provide visual coverage over an area which corresponds to the vehicle's current, estimated, projected or planned path, and possibly of a vicinity of such path.

In embodiments of the presently disclosed subject matter, as will be described in further detail below, an image (e.g., a current image) from the plurality of images can be obtained (block 410). The image can be fed to an animal detection processing block 420. A truncated animal visual appearance template can also be obtained (block 415). The image can be processed to determine if visual information which corresponds to the truncated animal appearance template appears in the image (block 420). It would be noted that the measure that is used to evaluate similarity of visual information to a template (e.g., the truncated animal appearance template) can be performed on some derivative of the visual information, and the actual data to which the measure is applied is not necessarily visually similar in appearance to the image data from which it was derived.

Optionally, when visual information that corresponds to the truncated animal appearance template appears in the image, it is further determined whether the appearance of such visual information is consistent with visual information in one or more previous frames which is suspected to be associated with an animal (or possibly with the same animal) (block 425). Optionally, the detection process can conclude that visual information that is suspected to be associated with an animal is a valid animal detection when visual information that is suspected to be associated with an animal consistently appears across a plurality of images. Consistency can be determined by a set of criteria or thresholds, as will be further discussed below. The processing scheme of the images can be serial where at any given time a single-image from the plurality of images is processed (e.g., a current frame in a video stream), and in case visual information which corresponds to the truncated animal appearance template appears in the image, consistency with visual information in one or more previous frames which is suspected to be associated with an animal (or possibly with the same animal) is evaluated. However, various other processing schemes can be implemented and used in embodiments of the presently disclosed subject matter.

When the detection process concludes that visual information that is suspected to be associated with an animal is a valid animal detection, the system may initiate one or more predefined actions or reactions (block 430) that may be determined based on one or more states of the vehicle, characteristics of the detected animal and its detected behavior, as well as a determination of a likelihood of a collision, as described in greater detail below with respect to FIG. 7.

According to embodiments of the presently disclosed subject matter, the truncated animal appearance template corresponds to appearance of at least a portion of a body and limbs of the animal and does not include a shape of a head of the animal. Optionally, the truncated animal appearance template corresponds to appearance of at least a portion of a body and limbs of the animal and does not include a shape of a head of the animal and of a tail of the animal. Optionally, the truncated animal appearance template corresponds to appearance of at least a portion of a body and four limbs of the animal. A description of an offline truncated animal appearance template generation process that can be used to generate a truncated animal appearance template for the animal detection process according to embodiments of the presently disclosed subject matter, is provided below. Still further by way of example, the animal detection process can include using one, two, three or more different truncated animal appearance templates, and images can be processed using one, two, three or more different truncated animal appearance templates. The decision with regard to the classification of visual information appearing in the image that is suspected to be associated with an animal located in or near the vehicle's path (e.g., the vehicle's estimated, projected or planned path) can be based on the application of one, two, three or more different truncated animal appearance templates, and in case more than one truncated animal appearance template is used, the plurality of templates can be processed independently or jointly.

Before resuming the description of FIG. 4, there is now provided, by way of example, a description of an offline truncated animal appearance template generation process that can be used to generate a truncated animal appearance template for the animal detection process according to embodiments of the presently disclosed subject matter. It would be appreciated that the following description is provided by way of example only, and that other processes for generating a truncated animal appearance template for the animal detection process according to embodiments of the presently disclosed subject matter can be devised. According to one embodiment, technicians can manually process a large amount of driving data. The driving data can include a plurality of images, e.g., a stream of video frames, captured while an image acquisition unit was mounted in a vehicle, and while the vehicle was in motion. The images could have been captured by a system that is similar to the system illustrated in FIGS. 1-3 and described above with reference thereto. However, other systems can be used for capturing the images, including systems which are not designed for ADAS or AV applications. It would be appreciated that the images of the animals that are processed by the technicians can come from any source, and are not necessarily captured from within or onboard moving cars.

The technicians can specify or mark certain image areas (sometime referred to herein as "image patches" or "warps") and indicate whether an animal appears within the marked area or not. The area of the image that is marked can be predefined. For example, 40×40 pixels patches can be used. The dimensions, shape, and size of the patches can be selected as desired. For example, the warps can be of any size and in any shape. The warps can be marked, drawn or otherwise produced with respect to any reference point or area in the patch or around it. For example, the warps or image patches can be an n×n square patch where the back of the truncated shaped of the animal is at the top of the square, possibly with a certain predefined number of pixels as a margin, and the lateral position of the truncated animal shape is symmetric so that there is an even or close to even margin (if there is a margin) from the edges of the patch to the edges of the truncated animal shape at either side. Still further by way of example, for each classifier type (e.g., each of Local Binary Patterns ("LBP") classifier; and Vertical, Horizontal, Forward and Backward ("VHFB") classifier), a different patch size can be used for the classifier separator, and the example patches of the training sets can be warped (resized) to the size and/or shape that was predefined for each training pattern.

In the example of the 40×40 pixels patches, a regression analysis having 1600 dimensions (40×') can be implemented, where the 40×40 pixel image patch is used as the vector input of 1600 dependent variables. The result variable can be a tag, e.g., 1 and −1, indicating whether a respective image is an example of an animal or not, respectively (or whether an animal appears in the respective patch or not).

Figure 5:
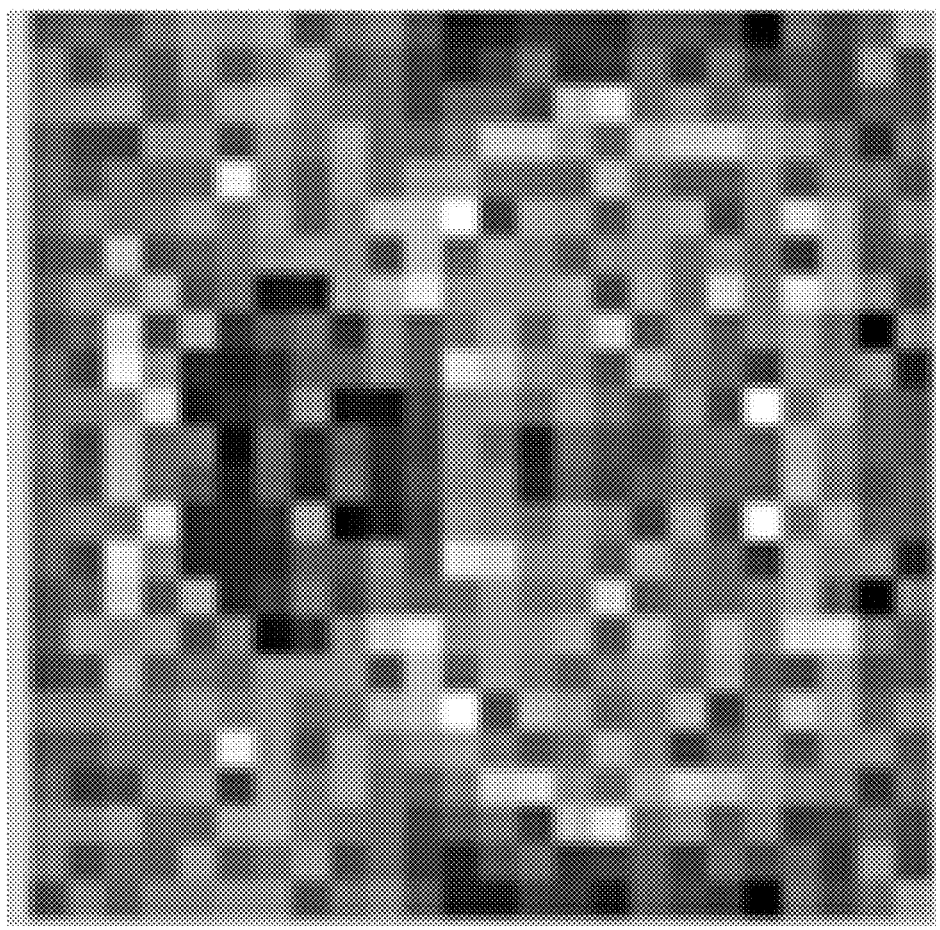
FIG. 5 is an example of a truncated animal appearance template consistent with disclosed embodiments.

FIG. 5, to which reference is now made, is a visualization of an example of a class separator vector or truncated animal appearance template that was created using machine learning over a pixel intensity derivation feature space, and which can be used in an animal detection process according to embodiments of the presently disclosed subject matter. The example template shown in FIG. 5 happens to be similar to the expected truncated animal shape. However, it should be noted, that the template is not always visually similar in appearance to the object against which it is to be matched. For example, the feature space that is used to generate the template may be of a type that is not human readable or visualizable. This can occur, for example, when the spatial context is lost (e.g., when the template could be a histogram).

Optionally, the animals are marked, and patches are produced by the technicians, irrespective of whether the animal is walking, running or standing. It would be appreciated that the technicians can be instructed to mark only certain types of animals or even only a specific type of animal. In another example, the technician can enter certain data with respect to the image, the animal, the kind of animal, and any other information which may be required by or useful for the truncated animal appearance template generation process and/or for its utilization in the animal detection process. Optionally, ambiguous or false appearances of animals ("non-animals") can also be collected, manually processed by the technicians and such non-animal patches can, for example, be marked as 'Ignore'. It would be appreciated that including a non-animals set can help reduce false positives in the animal detection process. It would be appreciated that a single set can be used for "animals" and "non-animals" patches, and each patch in the training set can be marked to indicate whether it corresponds to an appearance of an animal (or of a truncated animal) or not. Table 1 is a non-limiting illustration of a data structure that can be used as part of the training process:

TABLE 1

| Patch ID | Attributes | Y Animal likeness tags: Animal = 1 Non-animal = −1 |
|---|---|---|
| A1 | Attributes for Patch #1 (e.g., Animal) | 1 |
| A2 | Attributes for Patch #2 (e.g., Animal) | 1 |
| A3 | Attributes for Patch #3 (e.g., Non-Animal) | −1 |
| . | — | |
| . | — | |
| . | — | |
| An | Attributes for Patch #n (e.g., Non-Animal) | −1 |

A machine learning algorithm can be applied to the marked images. The machine learning algorithm can operate on a derivative of the visual information in the image, e.g., a gradient of brightness of adjacent lines analysis, say for generating an edge detection classifier, intensity histogram sets, say for generating a Local Binary Patterns ("LBP") classifier; counter sets, say for generating a Vertical, Horizontal, Forward and Backward ("VHFB") classifier, etc. The machine learning process can process the set of "animals" and "non-animals" patches, to produce a truncated animal appearance template. For example, the machine learning process can be used to calculate a classifier separator, e.g., a best-fit regression separator or a regression coefficient vector, which can be used in the animal detection process to classify input patches to target and non-target classes, or to animal and non-animal appearances. In the following description, by way of example, the truncated animal appearance template is sometimes referred to as classifier separator. The machine learning algorithms, and the classifier separator which it provides, are configured to support real-time classification processes of image patches, in particular as part of the animal detection process in accordance with embodiments of the presently disclosed subject matter. The classifier separator can be used to classify input visual information appearing in the images, to detect animal appearances in an image or in a set of images or to detect candidates of animal appearances and to filter detected animal candidates (in case multiple detection and filtering sub-processes are used).

By way of example, as part of the implementation of the machine learning process, a feature space can be selected and, based on the selected feature space, the machine learning algorithm can be configured to generate a classifier separator to partition between available classes in the collected training data (the "animal" set and possibly also the "non-animal" set). For illustration, a gradient of brightness of adjacent lines can be determined in order to highlight the edges. The differentiated images can be averaged to discover prominent edges. Various edge detection algorithms are known in the field and can be implemented, as part of embodiments of the presently disclosed subject matter, to generate the classifier separator that is later used for detecting animals.

If or when more training data (the "animal" set and possibly also the "non-animal" set) is later collected, it can be added to the existing collection to increase the accuracy of the machine learning in a future training iteration. A feature space refers to the collections of features that are used to characterize a data set. Examples of feature spaces that can be processed using machine learning algorithms to provide a truncated animal appearance template, or some component of a truncated animal appearance template, can include: derivatives of the image—to detect edges; Local Binary Patterns ("LBP") classifier of intensity histogram sets; Vertical, Horizontal, Forward and Backward ("VHFB") classifier of contour sets.

Formula 1, below, provides an example of a mathematical expression representing n patches where each one of the n patches is i*j pixels:

$$A^1_{(i,j)} = \begin{pmatrix} a^1_{(1,1)}, a^1_{(2,1)}, \ldots, a^1_{(i,1)} \\ a^1_{(1,2)}, a^1_{(2,2)}, \ldots, a^1_{(i,2)} \\ \vdots \\ a^1_{(1,j)}, a^1_{(2,j)}, \ldots, a^1_{(i,j)} \end{pmatrix}$$

$$A^2_{(i,j)} = \begin{pmatrix} a^2_{(1,1)}, a^2_{(2,1)}, \ldots, a^2_{(i,1)} \\ a^2_{(1,2)}, a^2_{(2,2)}, \ldots, a^2_{(i,2)} \\ \vdots \\ a^2_{(1,j)}, a^2_{(2,j)}, \ldots, a^2_{(i,j)} \end{pmatrix}$$

Formula 1

$$A^n_{(i,j)} = \begin{pmatrix} a^n_{(1,1)}, a^n_{(2,1)}, \ldots, a^n_{(i,1)} \\ a^n_{(1,2)}, a^n_{(2,2)}, \ldots, a^n_{(i,2)} \\ \vdots \\ a^n_{(1,j)}, a^n_{(2,j)}, \ldots, a^n_{(i,j)} \end{pmatrix}$$

Where, $A^n$ is the training set of patch examples (usually a large number of examples, say 10,000), and i*j are the set of pixels in an example patch.

Formula 2, below, provides an example of a mathematical expression representing a regression coefficient factor x that may be computed using the machine learning process, when applied over a selected feature space:

$$x = \begin{pmatrix} x_1 \\ x_2 \\ \vdots \\ x_{i*j} \end{pmatrix} \quad \text{Formula 2}$$

x is the classifier separator vector that is computed as the solution of the training set. For a 40×40 pixel patch set, x is a separator with 1600 dimensions and can be used to distinguish between patches in the training set which were designated as "animal" and patches in the training set which were designated as "non-animal".

Formula 3, below, provides an example of a vector of animal likeness tags (1 or (−1)) in the regression equation:

$$y = \begin{pmatrix} y_1 \\ y_2 \\ \vdots \\ y_n \end{pmatrix} \text{ where } A * x = y \quad \text{Formula 3}$$

According to embodiments of the presently disclosed subject matter, the animal detection process can use one, two, three or more different classifiers. An animal detection process that uses multiple classifiers according to embodiments of the presently disclosed subject matter is provided below.

In addition to the truncated animal appearance template, full animal appearance classifiers can be generated, using similar and/or other techniques, and possibly also based on the same sets of images. In operation, the animal detection process can, optionally, be configured to use the truncated animal appearance template(s) to detect animal candidates, and a full animal appearance template can be applied to the animal candidates, for example, to reduce false positives.

Optionally, the offline machine learning process can also involve a testing operation in which the classifier separator or a set of classifier separators are tested against a sample set of images or image patches to evaluate the reliability of the classification or animal detection that is achieved by the classifier separator or a set of classifier separators produced by the offline machine learning process. The test can involve patches in which an animal (or animals) appears, and test the classifier separator (or the set of classifier separators) for its ability to successfully detect the animal(s). The test can also involve patches in which an animal does not appear (non-animals), and test the classifier separator (or the set of classifier separators) for its ability to successfully detect that no animal appears in the patch. The truncated animal appearance templates for the animal detection process, as well as other template classifiers and filters that are used in the animal detection process can be selected based, at least in part, on the results of the testing operation.

Figure 6A:
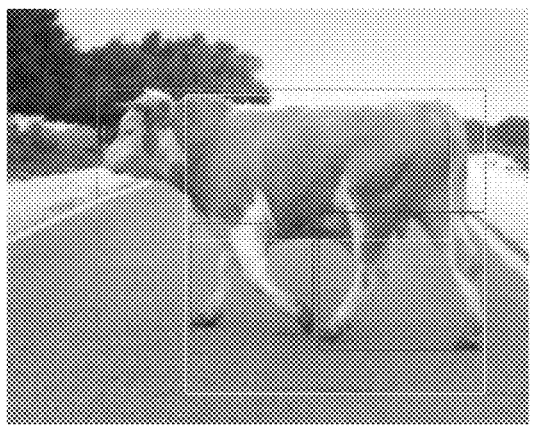
FIG. 6A illustrates example images of a cow used to generate a truncated animal appearance template consistent with disclosed embodiments.
Figure 6A:
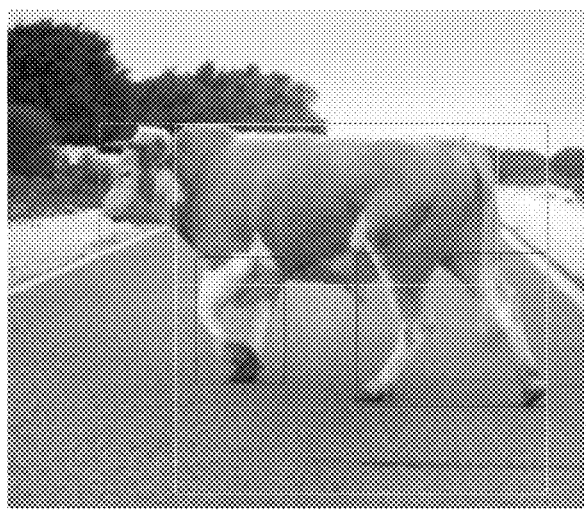
Figure 6A:
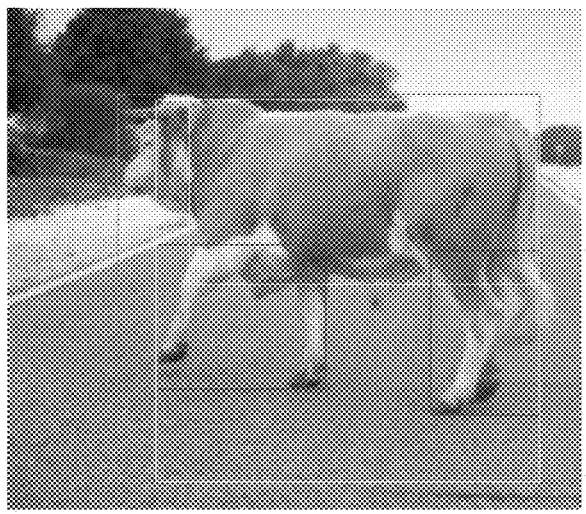

Reference is made to FIG. 6A which shows a series of images of a cow with markings that can be used as part of a process of generating a truncated animal appearance template for this kind of animal, in accordance with embodiments of the presently disclosed subject matter. As is shown in FIG. 6A, an area that includes a truncated shape of a cow is marked in a plurality of images of a cow (typically several different cows are used). In the case of the images shown in FIG. 6A, the truncated shape of the cow does not include the head of the cow. However, in FIG. 6A the truncated shape of the cow does include the cow's tail, since it cannot be clearly distinguished from the cow's torso. The image patches that include the truncated shape of the cow (or of different cows) can be used to train a class separator, and a corresponding truncated animal appearance template can thus be generated.

As is shown in FIG. 6A, the entire shape of the cow, including the head and tail can also be marked. A different classifier can be generated for the full shape of the cow, and in some embodiments of the animal detection process, a template corresponding to the full shape of the cow can also be used in addition to the truncated cow appearance template.

As is also shown in FIG. 6A, the limbs of the cow can also be marked. In some embodiments, only selective ones of the limbs or portions of the limbs may be marked.

Figure 6B:
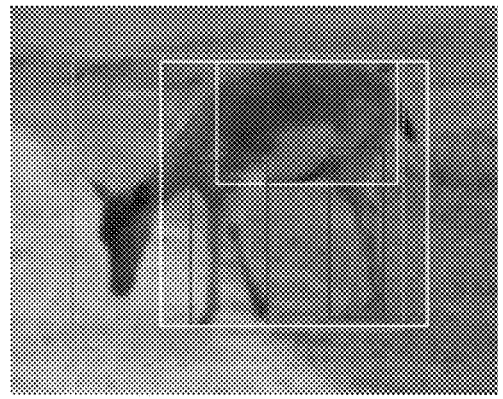
FIG. 6B illustrates example images of a deer used to generate a truncated animal appearance template consistent with disclosed embodiments.
Figure 6B:
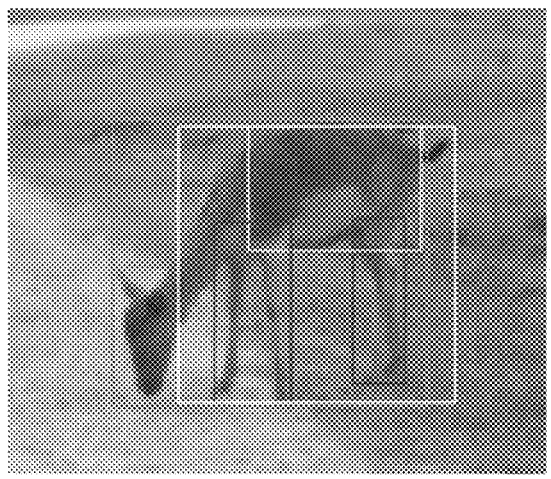
Figure 6B:
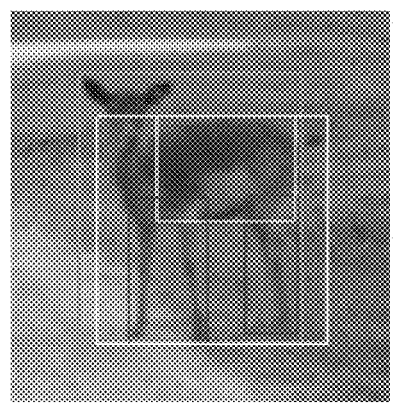

FIG. 6B shows a series of images with similar markings that were used in FIG. 6A but with respect to a deer, in accordance with embodiments of the presently disclosed subject matter. The images in FIG. 6B can be used to generate a classifier (or the respective templates) for a different animal, in this case a deer. As can also be seen in FIG. 6B, the training set can include images of animals at various angles relative to the main axis of the camera. Also apparent from FIG. 6B are the different positions of the head of the animal in the training set, whereas the torso of the animal is relatively the same regardless of the head pose.

Figure 6C:
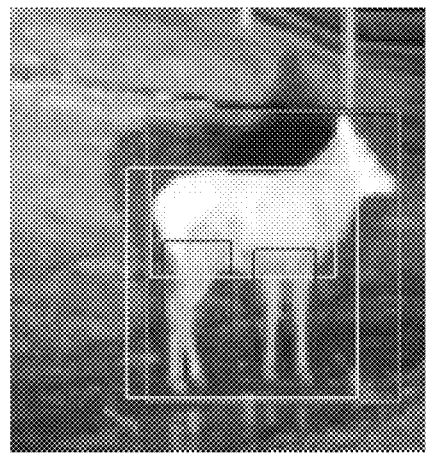
FIG. 6C illustrates example images of a deer used to generate a truncated animal appearance template consistent with disclosed embodiments.
Figure 6C:
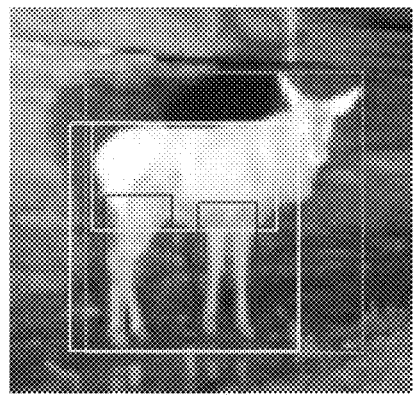
Figure 6C:
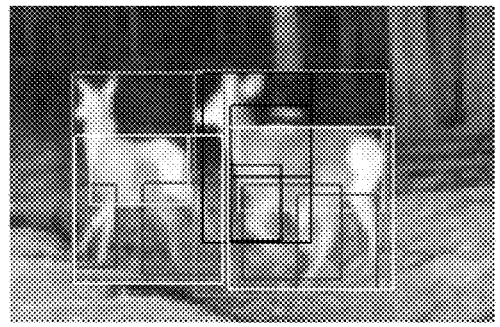

FIG. 6C shows IR images with similar markings that were used in FIG. 6B with respect to a deer, in accordance with embodiments of the presently disclosed subject matter. The images in FIG. 6B can be used to generate a classifier (or the respective templates) for IR cameras, which can be used, for example, in low light conditions.

Figure 7:
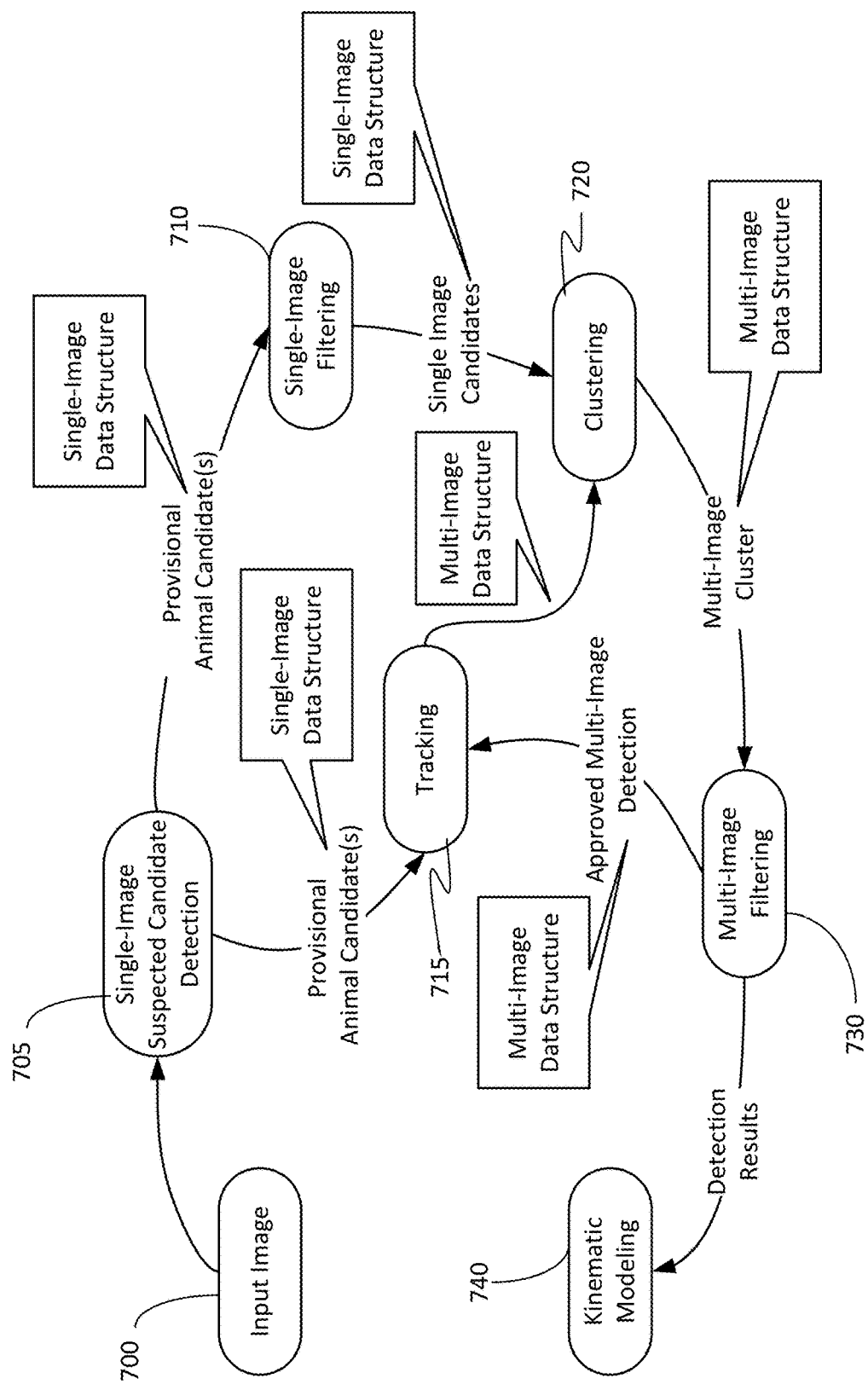
FIG. 7 a flowchart of an animal detection method consistent with disclosed embodiments.

FIG. 7 is a conceptual flow diagram illustrating a possible implementation of the method of detecting visual information corresponding to an animal, according to embodiments of the presently disclosed subject matter. The implementation of the method of detecting visual information corresponding to an animal shown in FIG. 7 includes an attention operation, which is configured to detect a large number of suspected animal candidates, followed by multiple filtering operations, including filters which evaluate consistency of appearances of visual information that is suspected to be associated with an animal across a plurality of images (or frames), and possibly filters that are configured to operate at the discrete image level (e.g., are applied to a current image). It would be appreciated that, as used herein, the term operation can relate to a single operation or to a set (plurality) of operations. An operation can be implemented as a certain sequence of operations, as a process, or as a routine.

Also shown in FIG. 7 is an optional kinematic modeling block which can be used as part of embodiments of the presently disclosed subject matter to model kinematics of an animal, specifically and possibly in relation to the vehicle's own motion.

In the implementation of the method of detecting visual information corresponding to an animal shown in FIG. 7, an input image (block 700) is processed in a single frame candidate detection block (block 705). The initial single image detection can be used to detect initial or provisional animal candidates in a current image (or a current frame of a video sequence). The terms provisional animal candidates and suspected animal candidates are used interchangeably in the present disclosure. The detection of suspected animal candidates is sometimes referred to as an attention operation, since it can be configured to detect a relatively large extent of visual information which may be associated with an animal in a vicinity of the vehicle. Subsequent filtering operations can be applied to the provisional animal candidates to filter false positives or provisional animal candidates which are determined not to be associated with animals. According to embodiments of the presently disclosed subject matter, the single frame candidate detection block uses a truncated animal appearance template to detect, for example, using template matching, visual information which appears in the image and which is suspected (as established using the truncated animal appearance template) to be associated with an animal. According to embodiments of the presently disclosed subject matter, the search for suspected animal candidates can include segmenting the image to search areas and using template matching to detect areas of the image that contain visual information that matches the template. It would be appreciated that the match or similarity criteria can be selected and tuned as required. The size of the search areas can be associated with a distance from the camera, such that for farther distances smaller search areas are used. The classifier template or the image patch that underlies the data structure that is used in the animal detection process can be warped so that they match one another, and the template can be applied to the image patch, or to a patch that represents some derivative of the visual information in a respective image patch.

Figure 12:
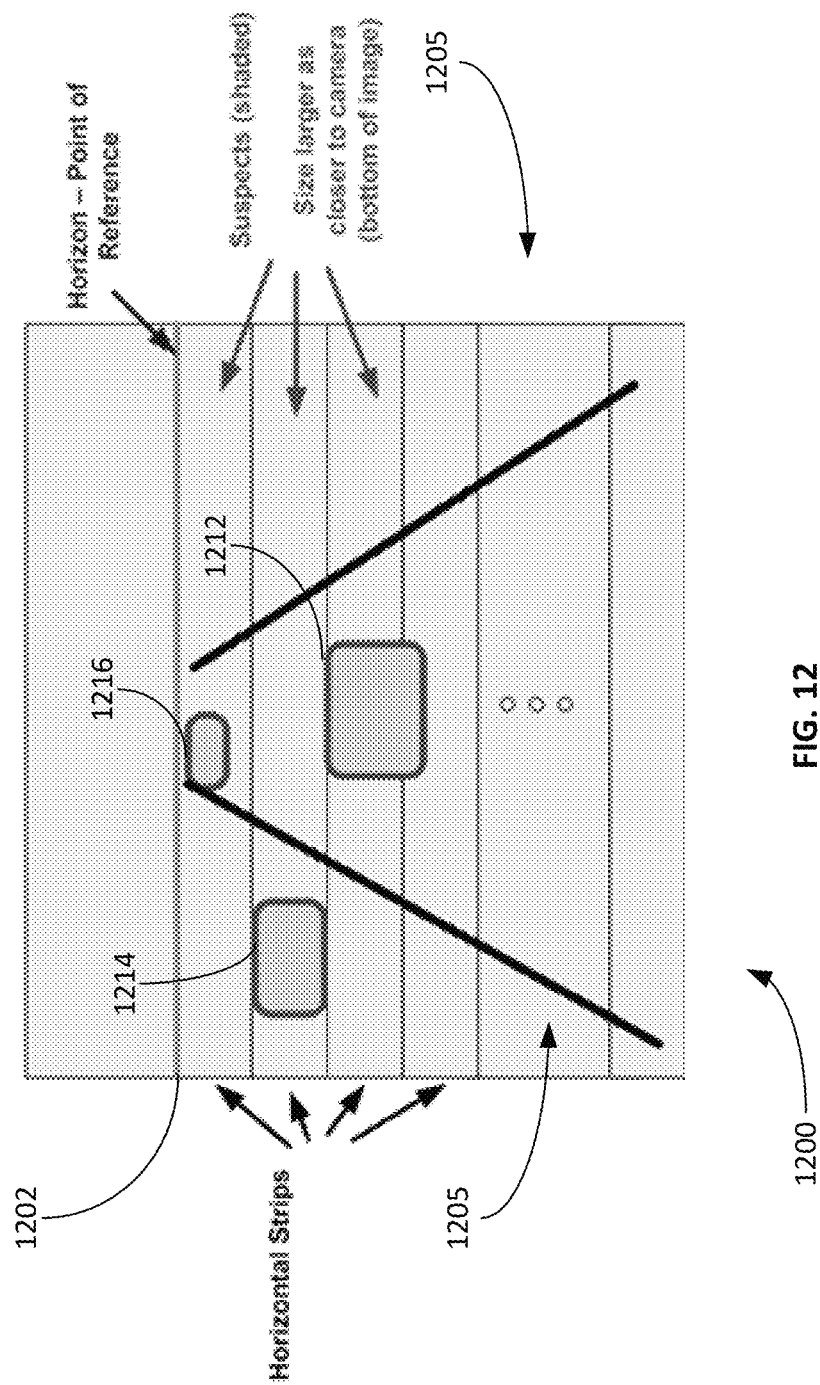
FIG. 12 illustrates examples of a search area as a function of a distance from a camera consistent with disclosed embodiments.

Reference is now made to FIG. 12, which is a graphical illustration of a different size of a search area in an image as a function of a distance from a camera mounted on a vehicle, as part of an animal detection process in accordance with embodiments of the presently disclosed subject matter. As can be seen in FIG. 12, a horizon 1202 can be identified in an image 1200. The horizon can be used as a point of reference for estimating a distance between various objects 1212, 1214, and 1216 on or near a road 1205 and vehicle on which a camera is mounted. As can be seen in FIG. 12, the closer the object is to the camera, the larger the patch, since the object would appear larger in the image, and in order to be detected as an animal, the object must match (or be within a certain range of) an expected size, which changes as a function of distance from the camera. Optionally, objects that are outside a predefined range are not searched for.

The size of the animal may also be taken into account when setting or configuring the size of the search areas. It would be appreciated that a certain area of the image can be part of a plurality of search areas, where each one of the plurality of search areas is associated with a different distance from the camera. The search areas are sometimes referred to in the present disclosure as rectangles, however, any other desired shape can be selected for the search areas.

Optionally, a search can be limited to a certain area of the image. Thus for example, a search can be conducted only within a region which corresponds to a road on which the vehicle is travelling and possibly some area around the road. Still further by way of example, the density of the search can be greater in certain areas of the image compared to other areas of the image. Thus, for example, a denser search area can be used for areas directly in the vehicle's path. According to embodiments of the presently disclosed subject matter, the search areas can be offset by one or more pixels (e.g., two, three, . . . , n) from one another.

If no suspected animal candidates (or provisional animal candidates) are detected in the image (e.g., as processed in a single frame candidate detection block (705), e.g., an attention operation), the animal detection process for this image ends or is terminated. The single frame candidate detection process can then be implemented on the next image (e.g., the next frame in a video stream).

Figure 8A:
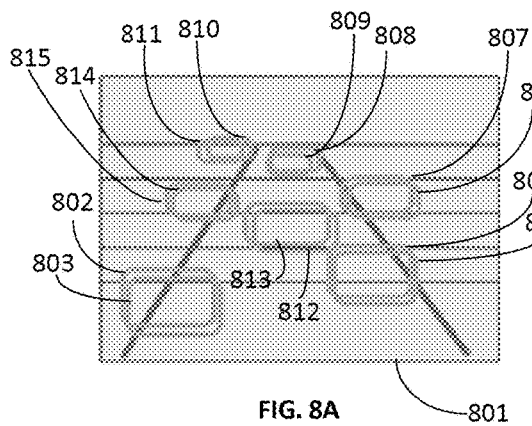
FIGS. 8A-8E illustrate an example implementation of an animal detection method consistent with disclosed embodiments.

Reference is now additionally made to FIGS. 8A-8E, which are graphical illustrations of one implementation scenario of the method of detecting visual information corresponding to an animal, at various implementation operations, according to embodiments of the presently disclosed subject matter. In FIG. 8A, there is shown a graphical illustration of an attention operation 705 of the implementation scenario. By way of example, this operation corresponds to block 705 of FIG. 7. Data structures corresponding to rectangles 802-815 in image 801 are marked in FIG. 8A. Each of the data structures associated with rectangles 802-815 includes digital information that is associated with visual information that corresponds to a truncated animal appearance in image 801. The digital information with which each of the data structures is associated, can be, and in FIG. 8A is, obtained from and relates to the visual information in the respective rectangle itself, although, as mentioned above, in other embodiments, the data structure can be associated with any desired shape or area of the underlying image(s). The digital information in the data structure can be derived in various forms from the visual information of the respective area of the image 801, and likewise, the derived digital information in the data structure can take on various forms. The digital information in the data structure may not necessarily be visually similar in appearance to the visual information in the respective area of the image. In this regard, it would be noted that the templates and the classifiers that are used to detect animal candidates (including provisional animal candidates) and/or to filter animal candidates are not necessarily based on similarity to the appearance of the visual information in the respective areas of the image. As already explained, the feature space that is used to generate a template may be of a type that is not human readable or visualizable.

In the following description, reference to rectangles in image 801 is interchangeable with reference to the respective data structures. It should be noted that in the multi-frame (or multi-image) processing operation(s), a data structure that corresponds to visual information associated with an animal candidate that appears in a plurality of images can be used. In this regard two different data structures can be used in embodiments of the presently disclosed subject matter. A single-image (or single frame) data structure for visual information that is associated with an animal candidate (visual information) that appears in a single image (or frame) can be used, as well as a multi-image (or multi-frame) data structure that is associated with an animal candidate (visual information) that appears in a plurality (two, three or more) of images (or frames).

In FIG. 8A, a truncated animal appearance template is used to detect in image 801 visual information (in this case rectangles) 802-815 that is suspected (as established using the truncated animal appearance template) to be associated with an animal. As can be seen in FIGS. 8A-8F, initially, in FIG. 8A, upon using a truncated animal appearance template, a relatively large number of areas 802-815 in the image 801 may be detected as containing visual information that is suspected to be associated with an animal. For convenience, this operation is referred to herein as the "attention operation". The use of the term "attention operation" should not limit the scope of the herein disclosed subject matter.

In the attention operation 705 of FIG. 7, according to embodiments of the presently disclosed subject matter, it is possible that for a given animal or even for certain visual information that is not an animal but has an appearance which causes the classifier that is used in the attention operation 705 to detect it as being possibly associated with an appearance of an animal in the image 801 (or with an appearance of a truncated shape of an animal in the image 801), a cluster including a plurality of rectangles (or any other shape) can be marked and a respective plurality of data structures can be created and saved to memory. For example, it would be appreciated that in a case where a truncated animal appearance template is used, several rectangles, each including a slightly different portion of the animal, or of any other object that is classified by the respective classifier as being a suspected animal candidate, form a cluster of suspected animal candidates. Subsequent operations of the animal detection process can be capable of filtering the redundant suspected animal candidates (as well as filtering false positive), such that out of such a cluster of suspected animal candidates, a rectangle or a respective data structure that best matches the subsequent animal detection search criteria may be selected, as will be further explained below.

It would be noted that the application of a truncated animal appearance template at the initial animal candidate detection operation (the attention operation 705) is one possible implementation according to an embodiment of the presently disclosed subject matter. In further embodiments of the presently disclosed subject matter, a truncated animal appearance template can be used at any other operation of an animal detection process in addition to the initial suspect candidate detection operation. For example, the provisional animal suspect candidates can be detected based on visual information that corresponds to a truncated animal appearance template, and at some later operation, say at the single-image filtering operation described below, one or more truncated animal appearance templates may also be used (the same ones as in the attention operation or different ones), and the templates used in the single-image filtering operation can be effective, at least in some cases, for filtering out one or more provisional suspected animal candidates that were detected in a previous operation. In still further embodiments of the presently disclosed subject matter, an animal detection process can include an initial operation (e.g., an attention operation 705) that does not use a truncated animal appearance template, and a truncated animal appearance template may be used at one or more subsequent operations of the animal detection process, and can be applied, for example, to a provisional set of suspected animal candidate that were detected by such an initial operation.

Figure 8B:
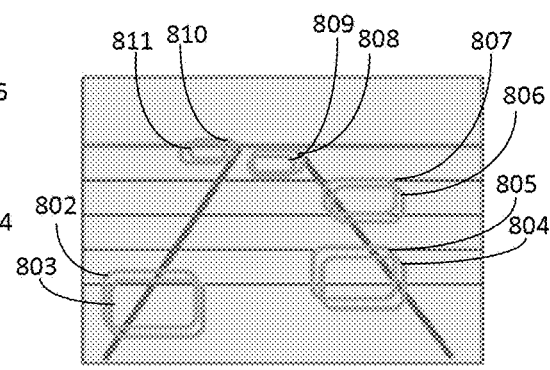

Returning to FIG. 7, following the attention operation 705, and the provisioning of the initial or provisional suspected animal candidates for image 801, one or more single-image filtering operations 710 can be implemented. FIG. 8B is a graphical illustration of a single-image filtering operation 710 of a method of detecting an animal, according to embodiments of the presently disclosed subject matter. In the single-image filtering operation 710, one or more discrete image filters are applied to the provisional suspected animal candidates, and subsequently zero or more (say one, two, . . . , n) provisional suspected animal candidates that were detected in the attention operation 705 are determined not to be associated with a visual appearance of an animal and are eliminated from the animal detection process. The eliminated animal candidates are no longer considered to be associated with an animal candidate and the respective data structures can be marked as "non-animal" or can be deleted from memory. It would be appreciated that any appropriate marking can be used, including for example, turning a bit (or two or three) which indicates the classification and state of the data structure on or off. In the scenario illustrated in FIG. 8B, rectangles 812, 813, 814, and 815 were filtered out, and in the respective data structures a "non-animal" indication was added. Alternatively, the data structures associated with rectangles 812, 813, 814, and 815 may have been deleted altogether.

The single-image filtering operation 710 that is implemented as part of the animal detection method according to embodiments of the presently disclosed subject matter can include application of a truncated animal appearance template. In further embodiments, the single-image filtering operation 710 can include application of full animal appearance templates, either in combination or as an alternative to the truncated animal appearance template, and can include templates that include the head but not the tail of the animal, etc.

There is now provided, by way of example, a description of several types of classifiers which can optionally be used as part of the single-image filtering operation 710. It would be appreciated that the single-image filtering operation 710 is not limited to use some or all of the classifiers mentioned here, and that other and/or additional classifier can be used to filter single-image data structures or suspected animal candidates (or provisional suspected animal candidates). The classifiers can be configured in any desired manner. The classifiers can be implemented in series or in parallel and in any order. Optionally, at different operations of the animal detection process, similar or the same classifiers can be used with different configurations. In case a plurality of classifiers are used, optionally, a score can be provided in association with each classifier and an overall score can be computed based on the scores of the individual classifiers. Optionally, different classifiers can be assigned with a different weight in the overall score calculation.

Before continuing with the description of FIG. 7, there is now provided a discussion, by way of non-limiting examples, of classifiers that can be used as part of the animal detection process according to embodiments of the presently disclosed subject matter. It would be appreciated that the following description is provided by way of example only, and that an exemplary animal detection process may use only some of the classifiers mentioned here and any other additional or alternative classifiers.

In one example, a local binary patterns (LBP) feature can be used in the animal detection process. LBP is a standard feature space for a classification algorithm that is used in computer vision to recognize target patterns in images. LBP describes a pattern as a set of gradients of pixel intensities, taking into account the gradient directions. The algorithm then combines a histogram of oriented gradients (HOG)

descriptor to the LBP feature and thus represents the pattern as a set of gradient histograms.

In the case of a truncated animal appearance the LBP-HOG classifier may tend to learn that truncated animal shapes have a set of certain characteristic pixel gradients histograms. The intensity gradients can be calculated by comparing the intensity of each pixel with the intensity of its neighbor. The LBP result can be represented by a binary number. Thus for example, the input patterns of the LBP classifier can be copies of patches of the original image that were detected in the attention operation as suspected animal candidates. The histogram for each of a plurality of sub-patches of a patch describes the intensity gradient characteristic.

Figure 9:
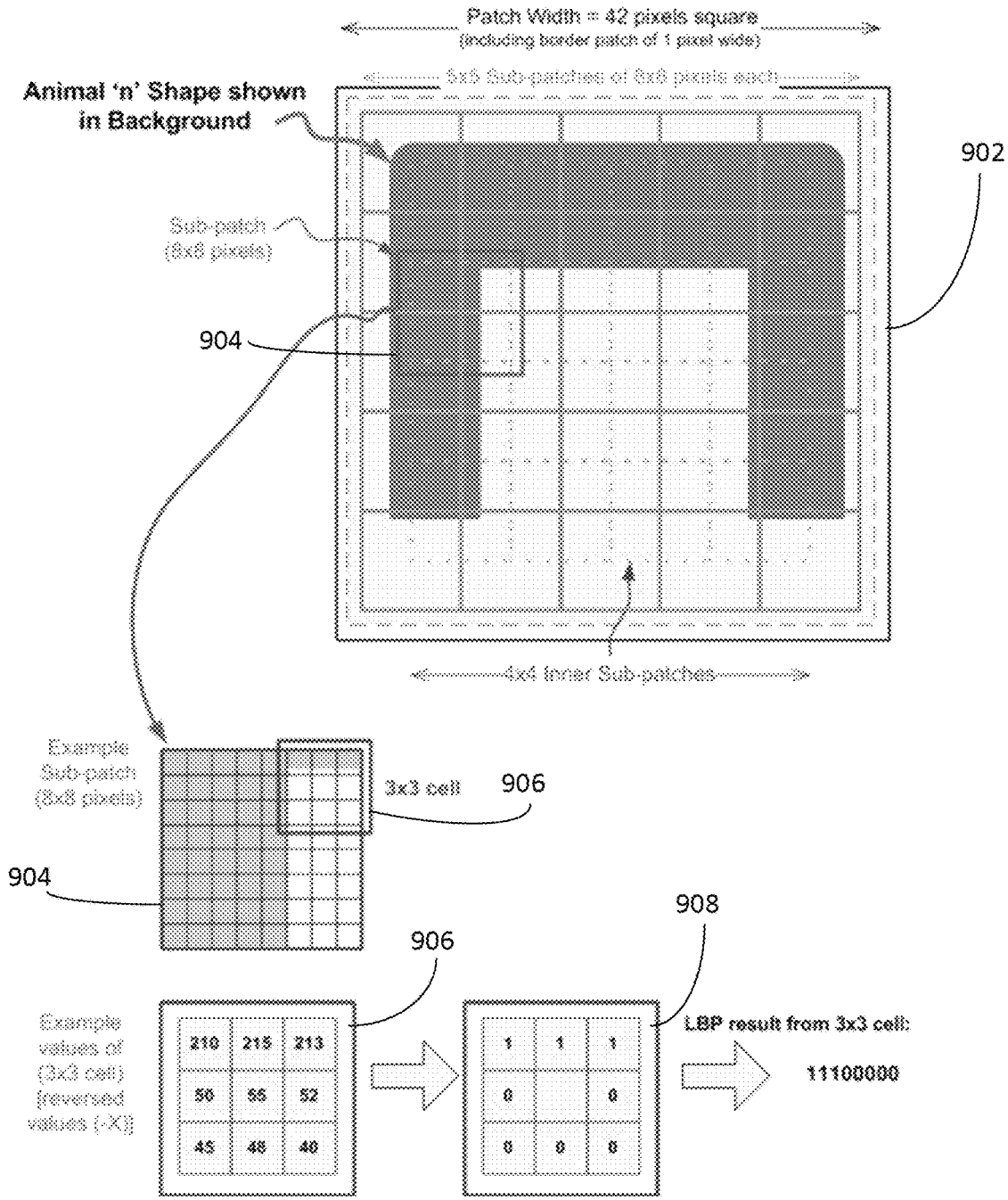
FIG. 9 illustrates an exemplary local binary pattern operator consistent with disclosed embodiments.

Referring now to FIG. 9, there is shown a graphical illustration of certain aspects of applying a LBP classifier to a patch 902 that corresponds to a truncated shape of an animal, as part of an animal detection process according to embodiments of the presently disclosed subject matter. The example input in FIG. 9 is a patch 902 that was obtained from a current image and it includes visual information that corresponds to a typical truncated animal appearance. The patch 902 in the diagram is a 42×42 pixels patch 902. The patch 902 may be segmented into 25 sub-patches of 8×8 pixels, leaving a one pixel wide border patch. Patch 902 may be further segmented into 16 additional inner sub-patches 904 of the same 8×8 pixel size but interlaced among the 25 sub-patches at a phase shift of half a sub-patch's width, for example, as shown. The combined 25 sub-patches and 16 inner sub-patches 904 give a total of 41 sub-patches. This division can contribute to the accuracy of the classifier. Each sub-patch may then be subdivided into 3×3 pixel internal cells 906. The intensity relation (using the LBP classifier in this case) for each cell 906 may be represented by a binary number or word. In one embodiment, only a subset of the possible binary words that may represent the intensity relation may be kept for processing. In one embodiment, for example, 30 of the possible binary words may be selected as "interesting" and only those 30 binary words may be recorded.

By way of example, the following LPB operation can be performed both on the example patterns in the training set and on the new input patterns to be classified against the training set, as follows:

Applying the LBP Operator:
1. For each patch 902:
   Iterate for each sub-patch 904:
   (i) Iterate for each (from a subset of selected cells) 3×3 cell 906 within the sub-patch 904:
      For each pixel in a cell 906, compare the pixel to each of its 8 neighbors in a circular sequence, e.g., from top-middle, top-left, etc. Where the center pixel's value is greater than the neighbor's value, mark "1". Otherwise, mark "0". This gives an 8-digit binary number (which can be converted to decimal for convenience).
   (ii) Compute the histogram 908 over the sub-patch, of the frequency of each intensity gradient. An example of an intensity gradient histogram is:
      1110000
      1111000
      1100000
      1010000

Combining LBP with Histogram (Histogram of Oriented Gradients)

Generate a histogram for each sub-patch 904. Then concatenate the (normalized) histograms of all sub-patches 904.

Visually, this can be a set of binary numbers representing the histogram gradients (which are not human readable or visualizable because the spatial context is lost). This can provide the feature vector for the patch 902.

Figure 10:
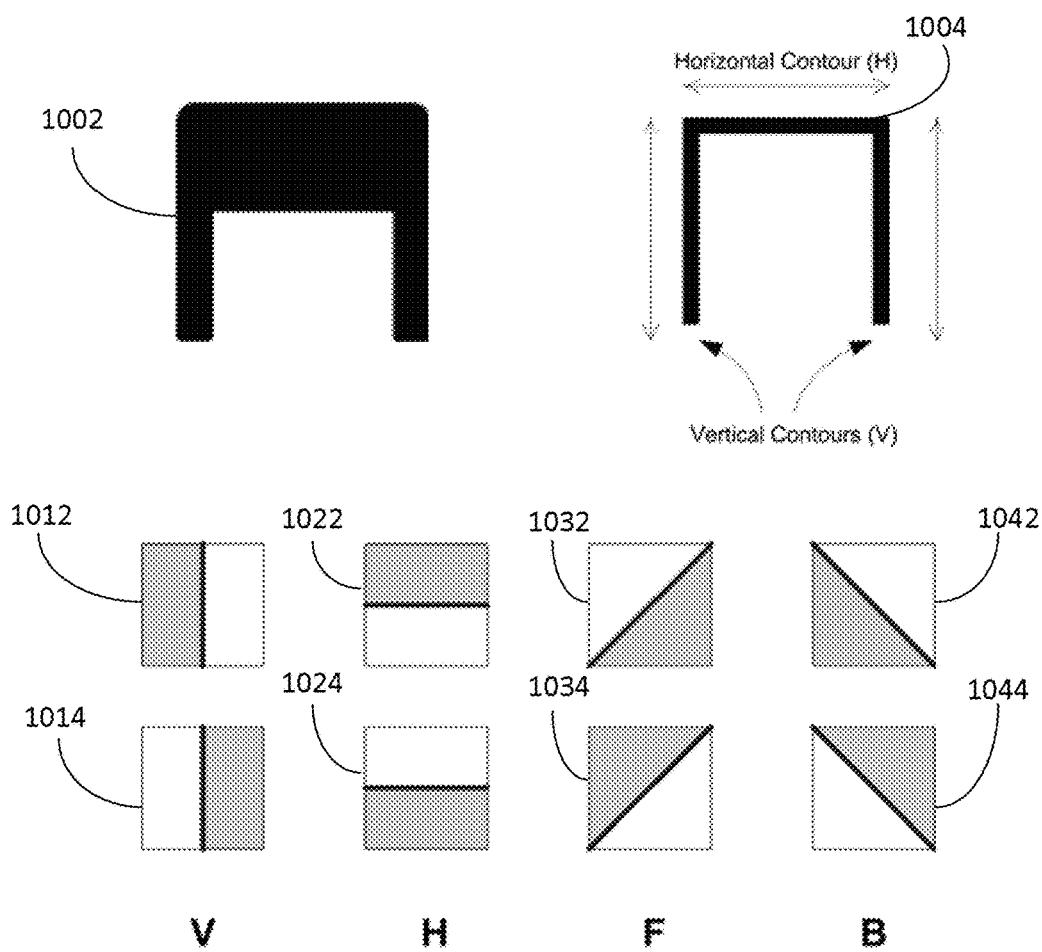
FIG. 10 illustrates an exemplary Vertical Horizontal Forward Backward operator consistent with disclosed embodiments.
Figure 10:
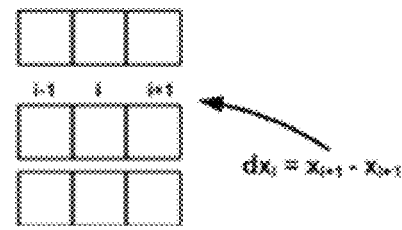

A Vertical Horizontal Forward Backward (VHFB) filter can also be used in the animal detection process. VHFB is a type of feature space used for classification of computer vision objects according to the contours in the image. In the case for truncated animal appearance, the VHFB classifier can be inclined to learn that animals have vertical and horizontal contours as shown in FIG. 10. In FIG. 10, a patch 1002, including a truncated shape of an animal, is obtained from a current image. A VHFB truncated animal appearance 1004 template that is based on typical contours of a truncated shape of an animal is obtained. In order to identify the contours in images, four different differentiators can be used (shown as the respective four pairs 1012, 1014; 1022, 1024; 1032, 1034; and 1042, 1044), where each of the differentiators (each of the pairs 1012, 1014; 1022, 1024; 1032, 1034; and 1042, 1044) can be applied to each pixel of the original image patch 1002. Four output response patches can thus be generated. Each of the response patches can provide a vector result that expresses the contours in the original patch 1002. For example, if an area contains a vertical contour the V differential will generate a large value, whereas the H, F, and B differentials will generate low values. By way of example, the four differentiations can be denoted by the following formulae:

$$V = \max(|dx| - |dy|, 0)$$

$$H = \max(|dy| - |dx|, 0)$$

$$F = \max(|dx + dy| - |dx - dy|, 0)$$

$$B = \max(|dx - dy| - |dx + dy|, 0)$$

VHFB Vertical (V) differentiation operator 1050 is an example of VHFB Vertical (V) differentiation operator that can be used to enhance vertical edges. The (V) differentiation operator 1050 can be multiplied over each line of the patch's 1002 pixels. Thus, for example, the expression for applying the V differentiator over all the patch 1002 lines can be as follows:

$$V_{ij} = \max(|dx_{ij}| - |dy_{ij}|, 0)$$

The H, F, and B operators can be implemented in a similar manner.

According to embodiments of the presently disclosed subject matter, after computing the VHFB transform, the VHFB application in the animal detection process can include computing the log of each channel (instead of normalization, which may be avoided). Then each channel can be blurred with a 3×3 mask. The motivation for blurring is to allow nearest neighbor warping. To classify a given region, the region's VHFB representation can be warped to a canonical size using a simple nearest neighbor warping method, for example. This feature vector can then be inserted into a standard quadratic classifier with n support vectors. In order to avoid precomputing the VHFB values at pixels that are shared by different candidates, the algorithm can first build a partial VHFB pyramid, so that VHFB values can be computed for all the required pixels without having to compute the full image.

Log Likelihood Ratio can be used to classify the visual information in a patch, for example, based on results of the classifiers used in the animal detection process. The LLR classifier operates on the probability that a new input instance is a positive (e.g., an animal), given the score result of the classifiers that were applied to the respective patch. Reference is now made to FIG. 11A, which is a schematic illustration of a probability of a new patch scoring X, given that the instance in reality is classified as a positive (falling in the positive class), and in a similar manner the probability of a new input instance obtaining a score X given that the instance in reality is classified as a negative (falling in the negative class), according to embodiments of the presently disclosed subject matter.

According to embodiments of the presently disclosed subject matter, the LLR score is denoted by:

$$Pr(P|\text{Score}=x)$$

By way of example, in order to calculate the LLR score, Bayes theorem can made use of, as follows:
For the positives:

$$Pr(P|\text{Score}=X) = Pr(\text{Score}=x|P) \cdot \frac{Pr(P)}{Pr(\text{Score}=X)}$$

For the negatives:

$$Pr(N|\text{Score}=X) = Pr(\text{Score}=x|N) \cdot \frac{Pr(N)}{Pr(\text{Score}=X)}$$

Where, Pr(P) and Pr(N) are termed prior knowledge. On the assumption that there is no other prior knowledge, it can be assumed that the probability for each instance to be or not to be is 50%.

It is also possible to make use of the distribution that was obtained during training:

$$lr = \frac{Pr(\text{Score}=x|P)}{Pr(\text{Score}=x|N)}$$

Wherein lr represents the relationship between: the degree that this score "explains" (e.g., is associated with) a positive instance (the patch includes an appearance of an animal or of a truncated shape of an animal), and: the degree that this score "explains" (e.g., is associated with) a negative instance (the patch includes an appearance of an animal or of a truncated shape of an animal).

It follows that if the score explains (e.g., is associated with) both the positives and negatives classes (without necessarily being equal), then the score cannot be relied on. For example, as in the graph shown in FIG. 10A, both Pr(Score=x|P) and Pr(Score=x|N) are high.

The LLR classifier can be given by the following mathematical expression:

$$LLR = \frac{Pr(P|\text{Score}=X)}{Pr(N|\text{Score}=X)} = \frac{Pr(\text{Score}=X|P)\frac{Pr(P)}{Pr(\text{Score}=X)}}{Pr(\text{Score}=X|N)\frac{Pr(N)}{Pr(\text{Score}=X)}}$$

On the assumption that:

$$Pr(P)=Pr(N)=0.5, \text{ these terms can also be eliminated from the expression}$$

FIG. 11B shows a schematic illustration of an LLR classifier including a minimum and maximum limit, according to embodiments of the presently disclosed subject matter. According to embodiments of the presently disclosed subject matter, the minimum and maximum limits can be applied as part of the LLR classifier implementation to avoid division by zero and to limit noise. Still further by way of example, the LLR range can be divided into bins. In each bin the LLR score can be calculated and points can be assigned. The points from each bin can be accumulated from each bin and linear regression can be calculated to obtain the a and b parameters in the following linear equation:

$$\text{LLR Score} = a \cdot \text{Score} + b$$

Returning to FIG. 7, according to embodiments of the presently disclosed subject matter, following the single-image filtering operation 710, a tracking operation 715 can be implemented. The clustering operation 720 can be part of a consistency evaluation process, which, in-turn, may be implemented as part of the animal detection process according to embodiments of the presently disclosed subject matter. The consistency evaluation can be used to evaluate the appearances of visual information that is suspected to be associated with an animal across a plurality of images (or frames).

Figure 8C:
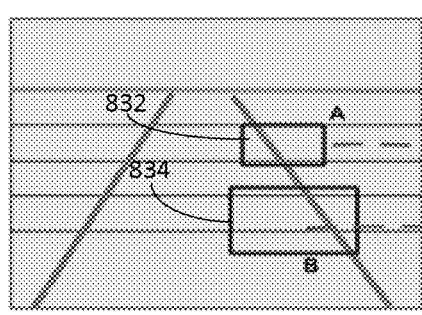
Figure 8C:
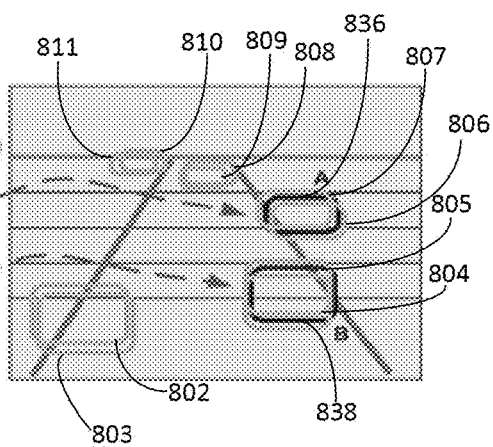

FIG. 8C is a graphical illustration of a tracking operation 715 of a method of detecting an animal, according to embodiments of the presently disclosed subject matter. In FIG. 8C, a tracking operation 715 is applied to the single-image animal candidates that passed the single-image filtering operation. In the tracking operation 715, tracking is applied to existing multi-image data structures that are associated with suspected animal candidates. For example, when the data structures of the single-image animal candidates are associated with time T=t of the animal candidate detection algorithm, the multi-frame data structures that are used as input in the tracking operation 715 are associated with time T=(t−1). The existing multi-image data structures are data structures that are associated with one or more previous images and which are associated with visual information that was detected as being associated with an animal suspect in the one or more previous images. In the tracking operation 715 a location and possibly also an appearance of one or more existing multi-image data structures can be adjusted according to a calculated estimated location where the animal candidate with which each one of the one or more existing multi-image data structures being tracked would appear in the current image, and optionally also the adjusted appearance of the visual information associated with the animal candidate in the current image. Thus, for example, the scale of the object with which the multi-image data structure is associated can be adjusted or the multi-image data structure can be adjusted to an estimated change in the scale of the object. In another example, the orientation of the object with which the multi-image data structure is associated can be adjusted or the multi-image data structure can be adjusted according to an estimated change in the orientation of the object. Optionally the tracking operation 715, can take into account a location of an animal candidate detected in the current image, and possibly also appearance of the visual information associated with the animal candidate in the current image. The tracking operation 715 can be based, for example, on ego motion of the vehicle (on which the animal detection system is mounted), based on optical flow analysis, etc.

It would be appreciated, that in case there is no previous data structure that is associated with an animal candidate (that was detected in the current image), tracking for that image is not applied. A multi-image data structure may be instantiated based on the single-image data structure in the current image and it can be used for subsequent operations of the animal detection algorithm that are applied to multi-image data structures, and for animal detection in a subsequent image, which uses multi-image data structures from the (one or more) previous frames. This specific case should not be regarded as an inconsistency and should not detract from the generality of the meaning of the term multi-image data structure. Thus the scope of the term multi-image data structure should be construed as encompassing this case as well.

The generation and processing of multi-image data structures according to embodiments of the presently disclosed subject matter can be implemented as part of the animal detection method, and will be described in further detail below. In the current image (the image associated with time T=t), the multi-image data structure is associated with one or more previous images (associated with time up to T=(t−1)). In the context of the tracking operation 715, it is to be noted that the multi-image data structure has or is associated with a location in the current image. According to embodiments of the presently disclosed subject matter, the location in the current image of the multi-image data structure can be associated with the location in at least one previous image of the visual information that was identified as being associated with a suspected animal in that image. This location can be adjusted to the current image, for example, by processing the current image (and possibly the previous image) to predict a location of the object (which is suspected to be an animal) that appeared in the previous image or images in the current image. The prediction can be based on ego-motion of the vehicle on which the animal detection system is mounted, and possibly also based on predicted animal motion. The prediction can average or otherwise integrate the suspected animal data (its appearance, location, etc.) from a plurality of images.

As can be seen in FIG. 8C as part of a tracking operation 715, existing multi-image data structures 832 and 834 are obtained (e.g., from memory), possibly after being adjusted to their predicted location (and respectively, the size of the respective object or patch) in the current image, and the single-image data structures 802-811, such as data structures 804, 805, 806, and 807 may be associated with and used to update the tracked multi-image data structures 832 and 834, resulting in updated multi-image data structures 836 and 838 (for data structures which were successfully tracked). The updated multi-image data structures 836 and 838 can have a location that is associated with the location of each respective input multi-image data structure, and the location of the one or more single-image data structures determined to be associated with that multi-image data structure. The object signature that is included in the multi-image data structure can also be based on the visual appearance of the suspected animal with which the previous version of the multi-image data structure was associated and based on the visual appearance of the suspected animal with which the respective single-image data structure(s) is associated. The matching of a (previous) multi-image data structure, say data structure 836 to single (current) image data structures 804 and 805 can rely on any matching or similarity evaluation algorithm and can use any threshold for distinguishing between matching and non-matching multi and single data structures. For example, the matching can be based on a similarity of the visual information with which the data structures are associated, the location in the image, consistency with a kinematic model, etc. Again, it would be noted that the measure that is used to evaluate similarity of visual information can be performed on some derivative of the visual information, and the actual data to which the measure is applied is not necessarily visually similar in appearance to the object from which it was derived. Optionally, the tracking operation 715 can include two tracking sub-operations, where the first tracking sub-operation can involve searching for a visual appearance of the object (e.g., a truncated animal appearance, or a full animal appearance) in the image that is the same or similar to an existing multi-image data structure, and the second tracking sub-operation can involve processing the image or portions of it to obtain some derivative of the visual information in the image or portions of it and matching the derivatives to a template with which the processing and the resulting derivative are compatible.

If more than one parameter is used for evaluating matches, weighting can be used to give different parameters more or less weight. It would be appreciated that the multi-image data structure adjustment to a current image can take into account various attributes of animals in general or of specific animals, such as speed of movement of the animal, movement patterns, etc.

Figure 8D:
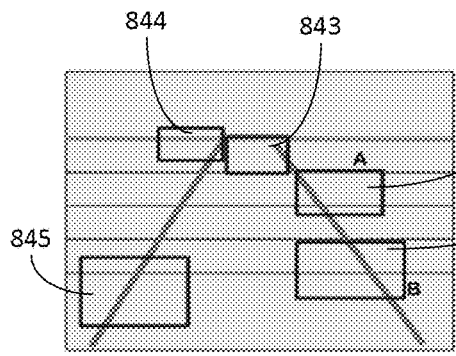

As can be seen in FIG. 8C, for some of the single frame data structures 802, 803 and 808-811, no match with an existing multi-frame data structure was found. Turning now to FIG. 8D, there is shown a graphical illustration of clustering operation as part of a method of detecting an animal, according to embodiments of the presently disclosed subject matter. In FIG. 8C, multi-image data structures were associated with single-image data structures. For example, when applied to a video sequence, the tracking operation 715 can be used to match animal suspects that were detected in a current frame with (potentially adjusted to the current frame) animal suspects that were detected in previous frames. The clustering operation 720 clusters adjacent single-image data structures (one or more) and multi-image data structures (typically one, but possibly more) and creates a multi-image data structure (or updates an existing one) for the clustered data structures.

According to embodiments of the presently disclosed subject matter, the clustering operation 720 can include identifying two or more data structures (single or multi image and in various combinations) that are associated with a common object in the environment (the object that is suspected to be an animal). According to embodiments of the presently disclosed subject matter, to determine whether two or more data structures are associated with a common object in the environment, the clustering operation 720 can include one or more of the following: evaluating a similarity between the visual information with which each of the data structures is associated, a location of the visual information with which each of the data structures is associated, applying some processing to the visual information with which each the data structures is associated and determining a similarity between a resulting derivative, etc. For example, in FIG. 8D, which is a graphical illustration of a clustering operation of a method of detecting an animal, according to embodiments of the presently disclosed subject matter, data structures 802 and 803 are clustered to provide data structure 845, data structures 804, 805 and 834 are clustered to provide data structure 841, data structures 806, 807 and 832 are clustered to provide data structure 842, data structures 808 and 809 are clustered to provide data structure 843, data structures 810 and 811 are clustered to provide data structure 844.

According to embodiments of the presently disclosed subject matter, the clustering operation 720 can include providing a (single) data structure for the clustered (two or more) data structures. Optionally, as part of providing the data structure for the clustered data structures, a location (in the current image) of the outcome data structure can be determined based on the locations of the respective clustered data structures. Optionally, as part of providing the data structure for the clustered data structures, a visual appearance with which the outcome data structure is associated can be determined based on the visual appearance with which each of the respective clustered data structures is associated. Optionally, as part of providing the data structure for the clustered data structures, a derivative of visual appearance with which the outcome data structure is associated can be determined based on the a processing of visual appearance with which each of the respective clustered data structures is associated. Optionally, the outcome data structure of the clustering operation 720 can be stored as multi-image data structures, including in the case of the clustering of only single-image data structures that were clustered together. Thus, data structures 841-845 can all be stored as multi-image data structures. Optionally, a single-image data structure which did not have any other data structures to be clustered with, can simply be converted to a multi-image data structure and can optionally be fed to subsequent operations of the animal detection process as such and used in subsequent processing of succeeding images. Optionally, converting a single-image data structure into a multi-image data structure can involve copying the data in the single-image data structure to a newly instantiated multi-image data structure.

Figure 8E:
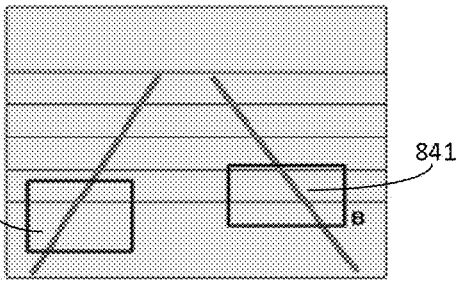

Optionally, following the clustering operation 720, a multi-image filtering operation 730 can be applied to the outcome of the clustering operation 720. In FIG. 8E, there is shown a graphical illustration of a multi-image filtering operation of a method of detecting an animal, according to embodiments of the presently disclosed subject matter. According to embodiments of the presently disclosed subject matter, one or more multi-image classifiers can be applied to the multi-image data structures that were created or which were updated in the clustering operation 720. The multi-image classifiers can include any one or more of the classifiers mentioned above with reference to the single-image filtering operation 710 or any other suitable classifier. The classifiers can be configured in any desired manner, and can be implemented in series or in parallel and in any order. Optionally, at different operations of the animal detection process, similar or the same classifiers can be used with different configurations. In case a plurality of classifiers are used, optionally, a score can be provided in association with each classifier and an overall score can be computed based on the scores of the individual classifiers. Optionally, different classifiers can be assigned a different weight in the overall score calculation.

As can be seen in FIG. 8E, some of the multi-image data structures 842, 843 and 844 failed to pass the multi-image filtering operation 730, while multi-image data structures 841 and 845 successfully passed the multi-image filtering operation 730. In FIG. 8E a multi-image data structure is either kept or discarded. An approved data structure, or an approved multi-image data structure in the embodiments of FIGS. 7 and 8, can be an output of the animal detection process according to embodiments of the presently disclosed subject matter. Thus, for example, if or when a multi-image data structure is determined to meet a predefined criteria, an indication of a detected animal can be triggered. In other embodiments, an indication of a successful detection of an animal can be based on the processing of a single image. In the following description, an approved data structure, that is, a data structure that met the animal detection criteria that is implemented by the animal detection process, is sometimes referred to as a detected animal or animal detection, although it would be appreciated that some false positive detections can occur in various real-life scenarios.

The indication of a detected animal can include details of the detected object with which the data structure that met the animal detection criteria is associated. The data in the indication of a detected animal can be obtained from the respective data structure. The data in the detected animal indication can include the distance to the animal, the position of the animal, the animal's size, a confidence level indicating the likelihood that the object is indeed an animal (this can be the score computed in the multi-image filtering operation 730 or any other score), etc. However, it would be appreciated that animal detection process can support additional classifications. FIG. 13 is a diagram illustrating a set of threshold scores for multi-image data structures and different states determined according to the thresholds, which can be used as part of an animal detection process according to embodiments of the presently disclosed subject matter. Table 2 below provides a description of the various possible states of a multi-image data structure following a multi-image filtering operation 730, according to embodiments of the presently disclosed subject matter:

TABLE 2

States of a multi-image data structure following a multi-image filtering operation.

| Approval Decision | Description |
|---|---|
| Approve | Approves the multi-image data structure to send it as a positive Detection result of current image.<br>Reason: multi-image data structure score is above an 'approve' threshold. A typical scenario can be when multi-image data structure has been continuously approved over a long enough sequence (e.g., as set by an image sequence threshold) of images.<br>Relevant to statuses: Approved, Non-Approved<br>Result status: Approved status |
| No Decision | Maintain a previous state of the multi-image data structure. If the multi-image data structure had an 'approved' state it would maintain the approved state, and if it had a 'not-approved' state it will remain 'not-approved' state.<br>Reason: multi-image data structure identification is not reliable enough to warrant changing the multi-image data structure status.<br>Relevant to statuses: Approved, Not-Approved<br>Result status: Current status unchanged |
| Not Approved | Disapproves the multi-image data structure. |

TABLE 2-continued

States of a multi-image data structure following a multi-image filtering operation.

| Approval Decision | Description |
|---|---|
| | A suspected animal was detected but further processing (e.g., the single image or multi-image filtering operations) indicate that the suspected animal is not a valid animal detection. Multi-image data structure is not entirely deleted and can be tracked and clustered in subsequent images. Reason: Visual information underlying a multi-image data structure is weak (below the thresholds of the 'approve' and the 'no decision' states) but is high enough to keep the data structure alive for possible further examination at subsequent images (it is higher than the 'kill' threshold). Relevant to statuses: Approved, No decision, Not-Approved Result: Not-Approved status |
| Kill | Kills (delete) the multi-image data structure. Reason: Very low quality indication for the multi-image data structure, optionally, over a number of frames. Relevant to statuses: Approved, No decision, Not-Approved Result: Multi-image data structure deleted |

According to embodiments of the presently disclosed subject matter, approved data structures can be reported to one or more driver assistance systems or to an autonomous vehicle system for initiating a predefined action or reaction (e.g., block 430 of FIG. 4). It would be also appreciated, that in some autonomous vehicle systems the action or reaction that is initiated by the autonomous vehicle system can be determined by a processor or any other computing component, module, or system that is running a neural network that was created through a machine learning process, including through the reinforcement learning process described, for example, in any of: U.S. Provisional Patent Application No. 62/274,883, filed Jan. 5, 2016, U.S. Provisional Patent Application No. 62/360,600, filed Jul. 11, 2016, U.S. Provisional Patent Application No. 62/361,352, filed Jul. 12, 2016, U.S. Provisional Patent Application No. 62/378,554, filed Aug. 23, 2016, and U.S. Provisional Patent Application No. 62/396,462, filed September 2016, all of which are hereby incorporated by reference in their entirety. Optionally, in addition to reporting the results to the driver assistance systems (or to an autonomous vehicle system), the results can be passed on to a kinematic modeling operation 740. Optionally, recommended vehicle actions (either to be performed by a driver of the vehicle or by an autonomous vehicle system) can be provided together with the animal detection indication, such as, apply break, change lane, etc.

According to embodiments of the presently disclosed subject matter, the animal detection method can optionally include a kinematic modeling operation 740. The kinematic modeling operation 740 can be applied to approved data structures. Optionally, the kinematic modeling can include a longitudinal distance (e.g., along a camera main axis) to the object associated with the indication, an angle (e.g., from the cameras main axis) to the animal (e.g., to the animal's center of mass), the animal's lateral position (e.g., relative to the camera's main optical axis, an indication as to whether the animal is on-road or off-road.

According to embodiments of the presently disclosed subject matter, as part of the kinematic modeling operation 740, the animal detection process can include predicting a motion of the animal. Optionally, the animal detection process can include identifying the direction of orientation of the detected animal. Optionally, the animal detection process can include detecting a location of a head and/tail of a detected animal. The location of the head and/tail of the detected animal can be used to estimate a direction of movement of the animal, and possibly also a speed of motion of the animal. The animal detection process, can integrate the vehicle's own motion, and possibly also compute the vehicle's predicted future motion, and use the estimated motion of the animal to assess the risk of a collision and/or to determine an evasive maneuver(s) for avoiding a collision between the vehicle and the detected animal, or for reducing the impact of the collision when it is determined that a collusion is unavoidable.

According to embodiments of the presently disclosed subject matter, the kinematic modeling can include various predefined animal attributes and/or animal behavior models, which can be used to predict the animal's behavior and the collision hazard. The animal's behavior model can be sensitive to a location of the animal relative to the vehicle, a motion of the animal, the animal's position, orientation, speed, etc. and state (e.g., walking, eating, standing, in the midst of a pack, etc.), and also to various states and/or attributes of the vehicle. The animal's behavior model can also be sensitive to an animal's type, and the animal detection process can be capable of providing an indication of a type of the detected animal. Thus, for example, if an animal is detected while standing on the road on which the vehicle is travelling and as the vehicle draws near the animal starts running off the road, the kinematic modeling operation can conclude that while an animal is successfully detected and the detection is approved across a plurality of frames, the detected animal does not pose a risk to the vehicle, since there is not risk of a collision. In a reverse example, an animal may be detected on the sides of the road, and as the vehicle approaches, the animal starts to run and enters a collision course with the encroaching vehicle.

According to embodiments of the presently disclosed subject matter, the kinematic modeling operation can provide an indication of a risk and/or of a severity of a collision. If the model confirms a collision course with the detected animal, the kinematic modeling operation can further include an estimation of whether this is a critical collision course, e.g., based on various evasive or preventive measure which can be employed to escape the collision, whether there is a high likelihood that there will actually be a collision, etc. Optionally, if it is determined that a collision is unavoidable, the animal detection process can include warning the host vehicle or driver of the vehicle of the imminent collision.

The foregoing description has been presented for purposes of illustration. It is not exhaustive and is not limited to the precise forms or embodiments disclosed. Modifications and adaptations will be apparent to those skilled in the art from consideration of the specification and practice of the disclosed embodiments. Additionally, although aspects of the disclosed embodiments are described as being stored in memory, one skilled in the art will appreciate that these aspects can also be stored on other types of computer readable media, such as secondary storage devices, for example, hard disks or CD ROM, or other forms of RAM or ROM, USB media, DVD, Blu-ray, 4K Ultra HD Blu-ray, or other optical drive media.

Computer programs based on the written description and disclosed methods are within the skill of an experienced developer. The various programs or program modules can be created using any of the techniques known to one skilled in the art or can be designed in connection with existing software. For example, program sections or program modules can be designed in or by means of .Net Framework, .Net Compact Framework (and related languages, such as Visual Basic, C, etc.), Java, C++, Objective-C, HTML, HTML/AJAX combinations, XML, or HTML with included Java applets.

Moreover, while illustrative embodiments have been described herein, the scope of any and all embodiments having equivalent elements, modifications, omissions, combinations (e.g., of aspects across various embodiments), adaptations and/or alterations as would be appreciated by those skilled in the art based on the present disclosure. The limitations in the claims are to be interpreted broadly based on the language employed in the claims and not limited to examples described in the present specification or during the prosecution of the application. The examples are to be construed as non-exclusive. Furthermore, the steps of the disclosed methods may be modified in any manner, including by reordering steps and/or inserting or deleting steps. It is intended, therefore, that the specification and examples be considered as illustrative only, with a true scope and spirit being indicated by the following claims and their full scope of equivalents.

What is claimed is:

1. A system for detecting an animal in a vicinity of a vehicle, the system comprising:
    at least one processor programmed to:
        receive, from an image capture device, at least one first visual image of the vicinity of the vehicle;
        analyze the at least one first image using a truncated animal appearance template to detect first visual information suspected to be associated with an animal, wherein the truncated animal appearance template corresponds to a portion of a body and one or more limbs of a suspected animal;
        receive, from the image capture device, at least one second visual image of the vicinity of the vehicle, the at least one second image being captured later in time than the at least one first image;
        analyze the at least one second image using the truncated animal appearance template to detect second visual information suspected to be associated with the animal; and
        initiate a vehicle response based on consistency of the first detected visual information of the suspected animal in the at least one first visual image with the second detected visual information of the suspected animal in the at least one second visual image.

2. The system of claim 1, wherein the at least one processor is further programmed to:
    segment the at least one first visual image into a plurality of search areas; and
    detect one or more areas of the at least one first visual image that include first visual information that matches the truncated animal appearance template.

3. The system of claim 2, wherein the at least one processor is further programmed to:
    determine whether visual information of a prior animal was detected in one or more prior captured images; and
    initiate the vehicle response when the first visual information of the suspected animal in the at least one first visual image is consistent with visual information of the prior animal detected in the one or more prior captured images.

4. The system of claim 2, wherein the at least one processor is further programmed to:
    generate a data structure corresponding to a detected area of the at least one first visual image that includes first visual information that matches the truncated animal appearance template;
    adjust the data structure according to a calculated estimated location of the suspected animal and an estimated change in scale of the suspected animal in a subsequent captured image;
    analyze the at least one second visual image with respect to the adjusted data structure to detect areas of the at least one second visual image that include second visual information that matches the adjusted data structure; and
    initiate the vehicle response when the at least one second visual image and the adjusted data structure meet a predefined criteria.

5. The system of claim 2, wherein the at least one processor is further programmed to determine a size of at least one of the search areas based on a detected distance of the first visual information in the at least one first visual image from the image capture device.

6. The system of claim 2, wherein the truncated animal appearance template does not correspond to a shape of a head of a suspected animal or a shape of a tail of a suspected animal.

7. The system of claim 2, wherein the at least one processor is further programmed to analyze the at least one first visual image using a plurality of truncated animal appearance templates.

8. The system of claim 2, wherein the truncated animal appearance template corresponds to a suspected animal having proportions characterized by a predetermined torso size and a predetermined limb size.

9. The system of claim 2, wherein the truncated animal appearance template corresponds to one of a plurality of truncated animal appearance templates of the suspected animal at one of a plurality of different viewing angles.

10. The system of claim 2, wherein the truncated animal appearance template corresponds to a suspected animal according to one of a plurality of states of motion including walking, running, and standing still.

11. The system of claim 2, wherein the truncated animal appearance template corresponds to an appearance of a suspected animal among a grouping of two or more animals positioned adjacent to one another.

12. The system of claim 1, wherein the consistency is based on consistency of the first visual information and the second visual information with a kinetic model.

13. The system of claim 1, wherein the at least one processor is further programmed to predict a motion of the suspected animal by applying a kinetic model to the first visual information and the second visual information.

14. The system of claim 13, wherein the vehicle response is based on the predicted motion of the suspected animal.

15. A method of detecting an animal in a vicinity of a vehicle, the method comprising:
receiving a first plurality of visual images of the vicinity of the vehicle from one or more image capture devices;
receiving a truncated animal appearance template, wherein the truncated animal appearance template corresponds to appearance of at least a portion of a body and one or more limbs of an animal without a shape of a head of the animal;
processing the first plurality of visual images using the truncated animal appearance template to detect, in at least one image from the first plurality of images, first visual information that corresponds to the truncated animal appearance template;
receiving, from the one or more image capture devices, a second plurality of visual images of the vicinity of the vehicle, the second plurality of visual images being captured later in time than the first plurality of visual images;
processing the second plurality of visual images using the truncated animal appearance template to detect, in at least one image from the second plurality of images, second visual information that corresponds to the truncated animal appearance template; and
initiating a vehicle response when visual information corresponding to the truncated animal appearance template is detected in the at least one image of the first plurality of images and the at least one image of the second plurality of images.

16. The method according to claim 15, wherein initiating the vehicle response comprises initiating at least one of an alert or a motion control instruction for the vehicle.

17. A system for detecting an animal in a vicinity of a vehicle, comprising:
a camera configured to acquire a first plurality of visual images of the vicinity of the vehicle during a first time period and a second plurality of visual images of the vicinity of the vehicle during a second time period later than the first time period;
a storage unit storing a truncated animal appearance template, wherein the truncated animal appearance template corresponds to an appearance of at least a portion of a body and limbs of an animal without a shape of a head of the animal; and
a processor configured to:
process the first plurality of visual images to detect in at least one of the first plurality of images first visual information that corresponds to the truncated animal appearance template;
process the second plurality of visual images to detect, in at least one of the second plurality of images second visual information that corresponds to the truncated animal appearance template; and
initiate a response when visual information corresponding to the truncated animal appearance template is detected in the at least one image of the first plurality of images and the at least one image of the second plurality of images.

18. The system of claim 17, wherein the processor is further configured to:
analyze a current captured image of the first plurality of images by segmenting the current image into a plurality of search areas; and
use template matching to detect areas of the current image that include first visual information that matches the truncated animal appearance template, wherein a size of the search area is based on a detected distance of the first visual information in the current image from the camera.

19. The system of claim 18, wherein the processor is further configured to:
determine whether visual information of a suspected animal was detected in one or more prior captured images of the plurality of images; and
initiate the response when the first visual information of the current image is determined, according to predefined criteria, to be consistent with visual information of a suspected animal detected in the one or more prior captured images.

20. The system of claim 18, wherein the processor is further configured to:
generate a data structure corresponding to a detected area of a first image of the first plurality of images that includes first visual information that matches a truncated animal appearance template;
adjust the data structure according to a calculated estimated location of the suspected animal and an estimated change in scale of the suspected animal in a subsequent image;
analyze a second image of the second plurality of images with respect to the adjusted data structure to detect areas of the subsequent image that include visual information that matches the adjusted data structure; and
initiate the response when the second image and the adjusted data structure meet a predefined criteria.

21. The system of claim 17, wherein the processor is configured to process the first and the second plurality of images using a plurality of truncated animal appearance templates.

22. The system of claim 17, wherein the truncated animal appearance template corresponds to a suspected animal having proportions characterized by a predetermined torso size and a predetermined limb size.

23. The system of claim 17, wherein the truncated animal appearance template corresponds to a suspected animal according to one of a plurality of states of motion including walking, running, and standing still.

* * * * *